US008365699B2

(12) United States Patent
Shkolnik et al.

(10) Patent No.: US 8,365,699 B2
(45) Date of Patent: Feb. 5, 2013

(54) HYBRID CYCLE ROTARY ENGINE

(75) Inventors: Alexander C. Shkolnik, Cambridge, MA (US); Nikolay Shkolnik, West Hartford, CT (US)

(73) Assignee: LiquidPiston, Inc., Bloomfield, CT (US)

( * ) Notice: Subject to any disclaimer, the term of this patent is extended or adjusted under 35 U.S.C. 154(b) by 65 days.

(21) Appl. No.: 12/939,752

(22) Filed: Nov. 4, 2010

(65) Prior Publication Data

US 2011/0114057 A1 May 19, 2011

Related U.S. Application Data

(62) Division of application No. 11/832,483, filed on Aug. 1, 2007, now Pat. No. 7,909,013.

(60) Provisional application No. 60/834,919, filed on Aug. 2, 2006, provisional application No. 60/900,182, filed on Feb. 8, 2007.

(51) Int. Cl.
*F02B 53/04* (2006.01)
*F02C 7/10* (2006.01)
*F02C 3/04* (2006.01)
*F01D 1/36* (2006.01)

(52) U.S. Cl. .......... 123/222; 60/39.511; 60/805; 415/90

(58) Field of Classification Search .................. 123/204, 123/205, 242, 218, 222; 418/60, 61.2; 417/423.4, 417/244; 137/805, 812, 112, 37; 251/28; 60/39.511, 805; 415/90

See application file for complete search history.

(56) References Cited

U.S. PATENT DOCUMENTS 1,061,206 A 5/1913 Tesla ............................... 60/805
1,200,133 A * 10/1916 Reed ............................... 60/805
1,329,559 A * 2/1920 Tesla ............................... 138/37
2,522,118 A * 9/1950 Guercken ....................... 60/805
2,945,619 A * 7/1960 McLure .......................... 60/805
3,045,428 A * 7/1962 McLean .......................... 60/805
3,249,095 A * 5/1966 Hamada ........................ 123/205
3,297,005 A * 1/1967 Lamm ........................... 123/218
3,362,633 A * 1/1968 Freeman ................ 235/201 ME
3,410,254 A * 11/1968 Huf .............................. 123/242
3,422,259 A * 1/1969 Freeman ................ 235/201 ME
3,466,002 A * 9/1969 Freeman ......................... 251/28
3,500,853 A * 3/1970 Freeman ....................... 137/112
3,515,158 A * 6/1970 Utz ............................... 137/812
3,557,813 A * 1/1971 Fegley et al. ................. 137/805
3,641,766 A * 2/1972 Uehling .......................... 60/262
3,899,875 A 8/1975 Oklejas et al. ............. 60/39.511
3,969,039 A * 7/1976 Shoulders ..................... 417/244

(Continued)

FOREIGN PATENT DOCUMENTS

WO WO 03074840 A2 * 9/2003
WO WO 2005071230 A2 * 8/2005

*Primary Examiner* — Thai Ba Trieu

(74) *Attorney, Agent, or Firm* — Sunstein Kann Murphy & Timbers LLP

(57) ABSTRACT

An internal combustion engine includes in one aspect a source of a pressurized working medium and an expander. The expander has a housing and a piston, movably mounted within and with respect to the housing, to perform one of rotation and reciprocation, each complete rotation or reciprocation defining at least a part of a cycle of the engine. The expander also includes a septum, mounted within the housing and movable with respect to the housing and the piston so as to define in conjunction therewith, over first and second angular ranges of the cycle, a working chamber that is isolated from an intake port and an exhaust port. Combustion occurs at least over the first angular range of the cycle to provide heat to the working medium and so as to increase its pressure. The working chamber over a second angular range of the cycle expands in volume while the piston receives, from the working medium as a result of its increased pressure, a force relative to the housing that causes motion of the piston relative to the housing.

6 Claims, 28 Drawing Sheets

U.S. PATENT DOCUMENTS 4,083,663 A * 4/1978 Montalvo .................... 123/222
4,112,977 A * 9/1978 Syred et al. .................. 137/812
4,311,270 A * 1/1982 Hovstadius .................... 494/2
4,536,285 A * 8/1985 Karlsson .................... 210/96.1
4,699,004 A * 10/1987 Evans et al. .................... 73/384
4,734,018 A * 3/1988 Taniyama et al. .......... 417/423.4
4,747,305 A * 5/1988 Evans et al. .................... 73/182
5,314,318 A * 5/1994 Hata et al. .................... 418/60
5,405,159 A * 4/1995 Klein et al. .................. 280/283
5,573,029 A * 11/1996 Freimann .......................... 137/1
5,586,780 A * 12/1996 Klein et al. .................. 280/275
5,935,424 A * 8/1999 Dyer et al. ...................... 210/85
7,191,738 B2 * 3/2007 Shkolnik ........................ 123/19
7,909,013 B2 * 3/2011 Shkolnik et al. .............. 123/204
2002/0182054 A1 12/2002 Entrican, Jr. .................... 415/90
2003/0086782 A1 * 5/2003 Moorehead et al. ............ 415/90

* cited by examiner (A)

(B)

(A)

Expander (B)

Compressor

HYBRID CYCLE ROTARY ENGINE

The present application is a divisional application of U.S. patent application Ser. No. 11/832,483, filed Aug. 1, 2007 in the names of Alexander C. Shkolnik and Nikolay Shkolnik and entitled "Hybrid Cycle Rotary Engine", the full disclosure of which is hereby incorporated by reference herein, and thereby also claims priority from U.S. Provisional Patent Application 60/834,919, filed Aug. 2, 2006, and U.S. Provisional Patent Application 60/900,182, filed Feb. 8, 2007, the contents of which are incorporated herein by reference.

FIELD OF THE INVENTION

The present invention relates to engines, and specifically, to hybrid cycle rotary engines.

BACKGROUND ART

Excluding very large ship diesels, the typical maximum efficiency of modern internal combustion engines (ICE) is only about 30-35%. Because this efficiency is only attainable in a narrow band of loads (normally close to full load) and because most vehicles typically operate at partial load around 70% to 90% of the times, it should not be surprising that overall, or "well to wheel," efficiency is only 12.6% for city driving and 20.2% for highway driving for typical mid-size vehicle.

There is prior art in which a Homogeneous Charge Compression Ignition (HCCI) cycle offers to improve the efficiency of internal combustion engines. While offering some advantages over existing engines, they too, however, fall short in providing high maximal efficiency. In addition, HCCI cycle engines also are polluting (particulate matter) and are difficult and costly to control because the ignition event is spontaneous and function of great many variables such as pressure, temperature, exhaust gas concentration, water vapor content, etc.

SUMMARY OF THE INVENTION

In one embodiment, the invention provides an engine. The engine of this embodiment includes a source of a pressurized working medium and an expander. The expander includes a housing, a piston, an intake port, an exhaust port, a septum, and a heat input. The piston is movably mounted within and with respect to the housing, to perform one of rotation and reciprocation. Each complete rotation or reciprocation defines at least a part of a cycle of the engine. The intake port is coupled between the source and the housing, to permit entry of the working medium into the housing. The exhaust port is coupled to the housing, to permit exit of expended working medium from within the housing. The septum is mounted within the housing and movable with respect to the housing and the piston so as to define in conjunction therewith, over first and second angular ranges of the cycle, a working chamber that is isolated from the intake port and the exhaust port. The heat input is coupled to the working medium at least over the first angular range of the cycle to provide heat to the working medium and so as to increase its pressure. In this embodiment the working chamber over a second angular range of the cycle expands in volume while the piston receives, from the working medium as a result of its increased pressure, a force relative to the housing that causes motion of the piston relative to the housing.

In a further related embodiment, the piston and the septum simultaneously define, at least over the first and second angular ranges of the cycle, an exhaust chamber that is isolated from the intake port but coupled to the exhaust port. Alternatively or in addition, the source includes a pump. Alternatively or in addition, the engine also includes a fuel source coupled to the expander; in this embodiment, the working medium includes one of (i) an oxygen-containing gas to which fuel from the fuel source is added separately in the course of the cycle and (ii) an oxygen-containing-gas with which fuel from the fuel source is mixed outside the course of a cycle, and the heat input is energy release from oxidation of the fuel at least over the first angular range, so that the engine is an internal combustion engine. As a further related embodiment, the working chamber has a volume, over the first angular range, that is substantially constant. Optionally the engine also includes a turbulence-inducing geometry disposed in a fluid path between the source of pressurized working medium and the working chamber to enhance turbulence formation in the working medium. Optionally, the engine also includes a fuel valve assembly coupled between the fuel source and the expander, and a controller, coupled to the fuel valve assembly. The controller is also coupled to obtain engine cycle position information, and controller operates the fuel valve assembly to cut off flow of fuel to the expander during a portion of the cycle when fuel addition is not needed. Also optionally, the engine also includes an air valve assembly coupled between the pressurized working medium source and the expander, and a controller, coupled to the air valve assembly. The controller is also coupled to obtain engine cycle position information, and the controller operates the valve assembly to cut off flow of the working medium to the expander during a portion of the cycle when addition of working medium is not needed. In a further related embodiment, the air valve assembly includes a check valve.

In a further related embodiment, introduction of the pressurized working medium through the intake port into the working chamber causes a temporary drop in the working medium pressure and efficient mixing of the working medium with fuel introduced into the working chamber, under conditions of continually increasing pressure of working medium in the working chamber, until temperature of the fuel-working-medium mixture reaches an ignition temperature resulting in combustion of the mixture. Optionally, such combustion causes an increase of pressure in the working medium that, in turn, causes the check valve to close automatically.

In a further related embodiment, the air valve assembly also includes a second valve coupled to the controller. Optionally, the air valve assembly also includes a latch on the check valve coupled to the controller to maintain the check valve in a closed position when directed by the controller. Optionally, the controller is configured to cause cut off of flow of fuel to the expander during some cycles of the engine so that the engine runs at less than a hundred percent duty cycle. Optionally, operation of the controller to cause cut off of fuel flow to the expander during some cycles of the engine effectuates no substantial reduction of supply of working medium to the expander, so that working medium supplied to the expander when fuel flow to the expander is cut off serves to cool the engine, and the controller is configured to operate the engine under normal conditions at less than one hundred percent duty cycle so as to provide cooling to the engine.

Also in a further related embodiment, the piston is a cam, and the septum is a cam-following rocker, engagable against the cam. Optionally, the engine includes a vessel for coupling the source to the intake port; the vessel includes a volume for storing pressurized working medium. Optionally, the vessel includes an air tank disposed in a location external to the housing. Also optionally, the first and second angular ranges are at least partially overlapping. Alternatively, the first and second angular ranges are non-overlapping. Optionally, the working medium is an oxygen-containing gas, and the engine further includes a fuel injector disposed in a fluid path from the source to a region within the housing. Optionally, the fuel injector is disposed in the intake port.

Also in a further related embodiment, the engine is a modified axial vane rotary engine, wherein the septum is a stator ring, the piston is a vane mounted for axial reciprocation in the stator ring, and the housing is a rotary cam ring that rotates with respect to the stator ring and includes a flattened region defining a dwell period over the first angular range during which the vane is stationary with respect to stator ring.

In yet another related embodiment of an engine in accordance with the present invention, the piston is a reciprocating blade, the septum is a hub having a circular cross section in which the piston is slidably mounted. The housing is concentrically disposed around the hub and rotates with respect to the hub and includes a first interior circular wall portion that maintains sealing contact with the hub in the course of the housing's rotation around the hub and a second wall portion contiguous with the first interior wall portion. The wall portions define, with the blade and the hub, a working chamber over the first and second angular ranges.

Another embodiment of the present invention provides a method of operating an internal combustion engine. The method of this embodiment includes using a cam, rotatably mounted in a housing, and a cam follower, mounted within the housing and movable with respect to the housing, to define, over first and second angular ranges of an engine cycle, a working chamber that is isolated from an intake port and an exhaust port. In this embodiment, the working chamber has substantially constant volume over the first angular range. The method additionally includes introducing fuel into the working chamber; introducing pressurized working medium into the working chamber over a fluid path through the intake port from a source of pressurized working medium, so as to cause a temporary drop in the working medium pressure and efficient mixing of the working medium with fuel introduced into the working chamber, under conditions of continually increasing pressure of working medium in the working chamber. The introduction of pressurized working medium continues until temperature of the fuel-working-medium mixture reaches an ignition temperature resulting in combustion of the mixture. The combustion causes an increase in pressure in the working medium wherein the increase in pressure causes rotation of the cam. The combustion commences within the first angular range.

In a further related embodiment, the method also includes closing a valve in the fluid path between the source of pressurized working medium and the working chamber when pressure in the working chamber exceeds pressure of the source of pressurized working medium. Optionally, the method further includes operating the cam and the cam follower simultaneously at least over the first and second angular ranges of the cycle to define an exhaust chamber that is isolated from the intake port but coupled to the exhaust port.

In another embodiment, the invention provides an internal combustion engine that includes a source of a pressurized working medium and an expander. The expander includes a housing, a cam, an intake port, an exhaust port, and a cam-following rocker. The cam is rotatably mounted within and with respect to the housing. Each complete rotation of the cam defines at least a part of a cycle of the engine. The intake port is coupled between the source and the housing, to permit entry of a working medium into the housing. The exhaust port is coupled to the housing, to permit exit of expended working medium from within the housing. The cam-following rocker is mounted within the housing and movable with respect to the housing and the cam so as to define in conjunction therewith, over first and second angular ranges of the cycle, a working chamber that is isolated from the intake port and the exhaust port. The working medium includes one of (i) an oxygen-containing gas to which fuel is added in the course of the cycle and (ii) an oxygen-containing-gas-fuel mixture. At least over the first angular range, oxidation of the fuel occurs and the working chamber has a volume that is substantially constant. Such oxidation provides heat to the working medium so as to increase its pressure. The working chamber, over a second angular range of the cycle, expands in volume while the cam receives, from the working medium as a result of its increased pressure, a force relative to the housing that causes rotation of the cam.

In a further related embodiment, the cam and the rocker simultaneously define at least over the first and second angular ranges of the cycle an exhaust chamber that is isolated from the intake port but coupled to the exhaust port.

In another embodiment, the invention provides an internal combustion engine that includes a housing, a cam, a cam-following rocker, a combustion chamber formed in the house, an intake port, and an exhaust port. The housing has an interior region with a generally circular cross section defined by an inner surface of the housing, wherein the generally circular cross section is interrupted by a rocker mounting region. The housing also has a pair of sides. The cam is rotatably mounted in the housing, and sweeps a circular path in the interior region. The cam is in sealing contact with the sides of the housing and also, when a leading edge of the cam is not adjacent to the rocker mounting region, is in sealing contact with the inner surface of the housing. The cam-following rocker is mounted in the rocker mounting region, in sealing contact with the sides of the housing, and, at least when the leading edge of the cam is not adjacent to the rocker mounting region, is in sealing contact with the cam. The rocker has a seated position defining generally, when a leading edge of the cam is adjacent to the rocker mounting region, a continuation of the circular cross section of the housing. The rocker is pivoted at a pivot end to move at a free end generally radially with respect to the circular path of the cam, so that the free end of the pivot reciprocates between the seated position and a maximum unseated position. The rocker completes a full reciprocation cycle when the cam completes a revolution around the working region. The combustion chamber is formed in the housing proximate to the rocker mounting region adjacent to the free end of the rocker, and has an opening. The opening is occluded over a first angular range of rotation of the cam. The inlet port is coupled to the combustion chamber for providing pressurized working medium. The working medium includes one of (i) an oxygen-containing gas to which fuel is added within or before the first angular range and (ii) an oxygen-containing-gas-fuel mixture. Combustion occurs within the first angular range so as to provide substantially constant volume combustion in the combustion chamber. The cam and the rocker are configured to provide an expansion region over a second angular range when the arcuate opening is not occluded. The exhaust port is formed in the housing proximate to the rocker mounting region adjacent to the free end of the rocker, for removing expended working medium.

In yet another embodiment, the invention provides an internal combustion engine that includes a housing, a piston, an intake port, an exhaust port, and a cam. The piston is reciprocally mounted within and with respect to the housing. Each complete reciprocation of the piston defines at least a part of a cycle of the engine, and each stroke of the piston defines its displacement in a working chamber of the housing. The intake port is coupled between the pump and the working chamber, to permit entry of the working medium into the working chamber. The working medium includes one of (i) an oxygen-containing gas to which fuel is added in the course of the cycle and (ii) an oxygen-containing-gas-fuel mixture. The exhaust port is coupled to the working chamber, to permit exit of expended working medium from within the working chamber. The cam is coupled to the piston, and defines displacement of the piston as a function of angular extent of the cycle. In this embodiment, at least over a first angular range of the cycle, oxidation of the fuel occurs and the cam has a shape that causes substantially no displacement of the piston, so that the working chamber has a volume that is substantially constant. Such oxidation provides heat to the working medium so as to increase its pressure. The working chamber, over a second angular range of the cycle, expands in volume while the piston receives, from the working medium as a result of its increased pressure, a force relative to the housing that causes displacement of the piston.

In another embodiment, the invention provides a virtual piston assembly that includes a body including at least one fluidic diode and a member rotatably mounted within the body. The member includes at least one fluidic diode. The member is disposed in relation to the body, and the body has a correspondingly shaped interior, so as to form a virtual chamber having a volume that varies with rotation of the member.

In a further related embodiment, the member is a disk. In another related embodiment, the member is cylindrical. In yet another related embodiment, the member is conical.

In another embodiment, the invention provides a pump that includes a housing, a cam, an intake port, an exhaust port, and a cam following rocker. The cam is rotatably mounted within and with respect to the housing. Each complete rotation of the cam defines at least a part of a pumping cycle. The intake port is coupled between the pump and the housing, to permit entry of a fluid. The exhaust port is coupled to the housing, to permit exit of pumped fluid from within the housing. The cam-following rocker is mounted within the housing and movable with respect to the housing and the cam so as to define in conjunction therewith, a working chamber that over a first angular range of the cycle is isolated from the from the intake port and from the exhaust port.

In a further related embodiment, the pump is a compressor, and the working chamber is a compression chamber. Optionally, the compression chamber over a second angular range remains isolated from the intake port but coupled to the exhaust port. Optionally, the rocker and the cam simultaneously define at least over the first angular range an intake chamber that is isolated from the exhaust port and coupled to the intake port.

In yet another embodiment, the invention provides an internal combustion engine that includes a source of a pressurized working medium, a fuel source, and an expander. The fuel source is optionally a pump. The expander includes a housing, a piston an intake port, an exhaust port, and a septum. The piston is movably mounted within and with respect to the housing, and performs one of rotation and reciprocation. Each complete rotation or reciprocation defines at least a part of a cycle of the engine. The intake port is coupled between the source and the housing, to permit entry of the working medium into the housing. Optionally, a turbulence-inducing geometry is disposed in a fluid path between the source of pressurized working medium and the working chamber to enhance turbulence formation in the working medium. The exhaust port is coupled to the housing, to permit exit of expended working medium from within the housing. The septum is mounted within the housing and movable with respect to the housing and the piston so as to define in conjunction therewith, over first and second angular ranges of the cycle, a working chamber that is isolated from the intake port and the exhaust port. Also the working chamber has a volume, over the first angular range, that is substantially constant, and the piston and the septum simultaneously define at least over the first and second angular ranges of the cycle, an exhaust chamber that is isolated from the intake port but coupled to the exhaust port. The working medium includes one of (i) an oxygen-containing gas to which fuel from the fuel source is added separately in the course of the cycle and (ii) an oxygen-containing-gas with which fuel from the fuel source is mixed outside the course of a cycle. The fuel undergoes combustion in the working chamber at least over the first angular range. The combustion provides heat to the working medium so as to increase its pressure. The working chamber over a second angular range of the cycle expands in volume while the piston receives, from the working medium as a result of its increased pressure, a force relative to the housing that causes motion of the piston relative to the housing. Optionally the embodiment includes a fuel valve assembly coupled between the fuel source and the expander. Also optionally, the embodiment includes an air valve assembly coupled between the pressurized working medium source and the expander. The air valve assembly optionally includes a check valve. Optionally, the embodiment includes a controller, coupled to the optional fuel valve assembly and to the optional air valve assembly. The controller is also coupled to obtain engine cycle position information, and operates the optional air valve assembly to cut off flow of the working medium to the expander during a portion of the cycle when addition of working medium is not needed and operates the optional fuel valve assembly to cut off flow of fuel to the expander during a portion of the cycle when fuel addition is not needed. Also optionally, the controller is configured to cause cut off of flow of fuel to the expander during some cycles of the engine so that the engine runs at less than a hundred percent duty cycle. Also optionally, operation of the controller to cause cut off of fuel flow to the expander during some cycles of the engine effectuates no substantial reduction of supply of working medium to the expander, so that working medium supplied to the expander when fuel flow to the expander is cut off serves to cool the engine; in such a case the controller is configured to operate the engine under normal conditions at less than one hundred percent duty cycle so as to provide cooling to the engine. Optionally the piston is a cam, and the septum is a cam-following rocker, engagable against the cam. Optionally introduction of the pressurized working medium through the intake port into the working chamber causes a temporary drop in the working medium pressure and efficient mixing of the working medium with fuel introduced into the working chamber, under conditions of continually increasing pressure of working medium in the working chamber, until temperature of the fuel-working-medium mixture reaches an ignition temperature resulting in combustion of the mixture; such combustion causes an increase of pressure in the working medium that, in turn, causes the check valve to close automatically.

DETAILED DESCRIPTION OF SPECIFIC EMBODIMENTS

Definitions. As used in this description and the accompanying claims, the following terms shall have the meanings indicated, unless the context otherwise requires:

"Sealing contact" of two members shall mean that the members have sufficient proximity directly, or via one or more sealing components, so as to have acceptably small leakage between the two members. A sealing contact can be intermittent when the members are not always proximate to one another.

A port is "coupled" to a chamber when at least some of the time during a cycle it is in communication with the chamber.

A full "reciprocation cycle" of a rocker that reciprocates between seated position and a maximum unseated position includes 360 degrees of travel of the main shaft, wherein travel from one of such positions to the other of such positions amounts to 180 degrees of travel of the main shaft.

The "working medium" describes the various substances which may usefully injected into the working chamber, In the case of an internal combustion engine, "working medium" includes an oxygen-containing gas either by itself (in which case fuel is added in the course of a cycle) or mixed with fuel outside the course of a cycle. The oxygen-containing gas may include air or oxygen, alone or mixed, for example, with one or more of water, superheated water, and nitrogen.

The "working chamber" of an engine relates collectively to the portions thereof (i) wherein a heat input is received (being a combustion chamber in the case of an internal combustion engine) and (ii) wherein expansion caused by increased pressure on account of delivery of heat is used to drive a piston that reciprocates or rotates in the engine.

Figure 1:
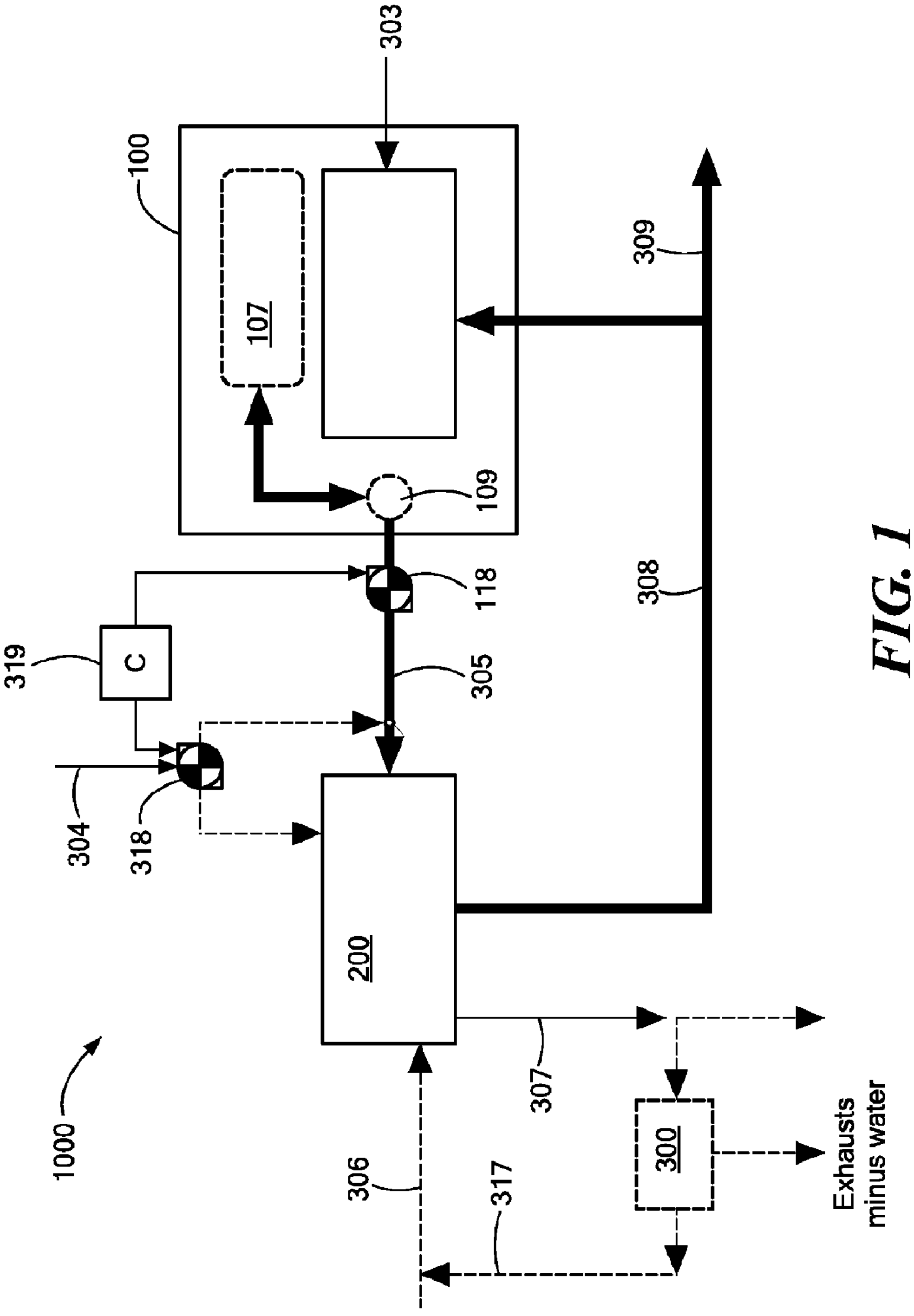
FIG. 1 shows an exemplary schematic depiction of a hybrid-cycle rotary engine (HCRE).

FIG. 1 is a schematic representation of a hybrid-cycle rotary engine (HCRE) 1000 according to one embodiment of the present invention. A compressed air module (CAM) 100 takes atmospheric air 303, compresses it to relatively high pressures, (optionally) stores it in an external air tank 107, conditions it (i.e. regulates pressure and/or temperature in a combination distributor/conditioner 109), and sends it, via air valve assembly 118, to a power generation module (PGM) 200. The air valve assembly includes a one-way check valve to prevent back flow of air during combustion. Controller 319 is coupled to the air valve assembly to maintain the air supply in an off position during the portion of the cycle when air addition is not needed. The controller acts on the assembly by either a second valve or by latching the check valve in a closed position.

PGM 200 receives compressed air 305 from CAM 100 and fuel from fuel supply 304. PGM 200 combusts fuel under essentially constant volume conditions and expands the combustion products in an expander 201 (shown in FIG. 2), thereby converting the thermal energy of the combustion products into mechanical power 308. This mechanical power 308 is used first to drive CAM 100 and the remaining work 308 is used by an external load 309. There is the option for water 306 to enter PGM 200 and cool, seal, and lubricate PGM 200, as well as to suppress NOx formation. An optional condensing unit 300 condenses steam contained in exhaust gas 307 and returns condensed water 306 to the water loop 317. We show optional paths for entry of fuel from fuel supply 304, The fuel may be injected directly into the combustion chamber in the course of a cycle, separately from compressed air 305, in which case the left-hand dotted arrow applies to the fuel path. Alternatively, the fuel may be mixed with the compressed air 305 outside the course of a cycle before being introduced into the combustion chamber, in which case the right-hand dotted arrow applies to the fuel path. It is also possible to use both of the methods above by admitting a premixed air-fuel mixture into the combustion chamber and also injecting directly into the combustion chamber the same or different fuel.

Entry of fuel from fuel supply 304 is gated by fuel valve assembly 318. If fuel takes the left-hand dotted path just described, then the fuel valve assembly 318 may be implemented as an injector valve. In addition, the controller 319 causes operation of the fuel valve assembly 318 to maintain the fuel supply in an off position during the portion of the cycle when fuel addition is not needed. Additionally, the controller 319 is used to keep fuel cut off during "off-cycles" described below in connection with the "digital mode of operation". The controller 319 has a variety of engine parameter and user inputs. It obtains cycle position information from a location such as the output shaft of the engine and uses this position information to control the fuel valve assembly 318. Furthermore, the controller obtains user input as to desired power (which in the case of the engine's being used in an automobile corresponds to accelerator pedal position), the engine speed, the engine wall temperature, as well as other optional parameters, to decide whether or not the cycle should fire (on) or be skipped (off) and whether the fuel only should be cut off, or both fuel and air cut off. Alternatively or in addition, the controller is configured to determine the amount of fuel to be supplied in each cycle.

The controller may operate totally mechanically—control of fuel injection in early diesel engines was achieved with total mechanical control, for example—and analogous techniques may be employed in this different context in order to achieve the necessary control. Alternatively, the controller may use a microprocessor operating with a suitable program, in a manner known in the art, to provide electronic control of the valve assembly, and the valve-assembly under such circumstances may include, for example, a solenoid-operated valve that is responsive to the controller.

The structure of engine 1000 is now described with reference to FIGS. 2-4. CAM 100 consists of a compressor 101, which takes atmospheric air 303 and compresses it to relatively high pressures and sends it through a 3-way valve 108 to either a small, optional, air buffer 105 or an optional external air tank 107. If optional air buffer 105 is not used, air is sent directly to PGM 200. The volume of air buffer 105 is typically 10 to 30 times the volume of a corresponding PGM combustion chamber 212 (described below), i.e. of sufficient volume to support supplying approximately constant pressure to the PGM combustion chamber 212. CAM 100 and PGM 200 may or may not be physically located within the same engine housing walls. CAM 100 and/or PGM 200 could be disconnected as needed to recover braking energy or to increase the instantaneously available power.

Figure 2:
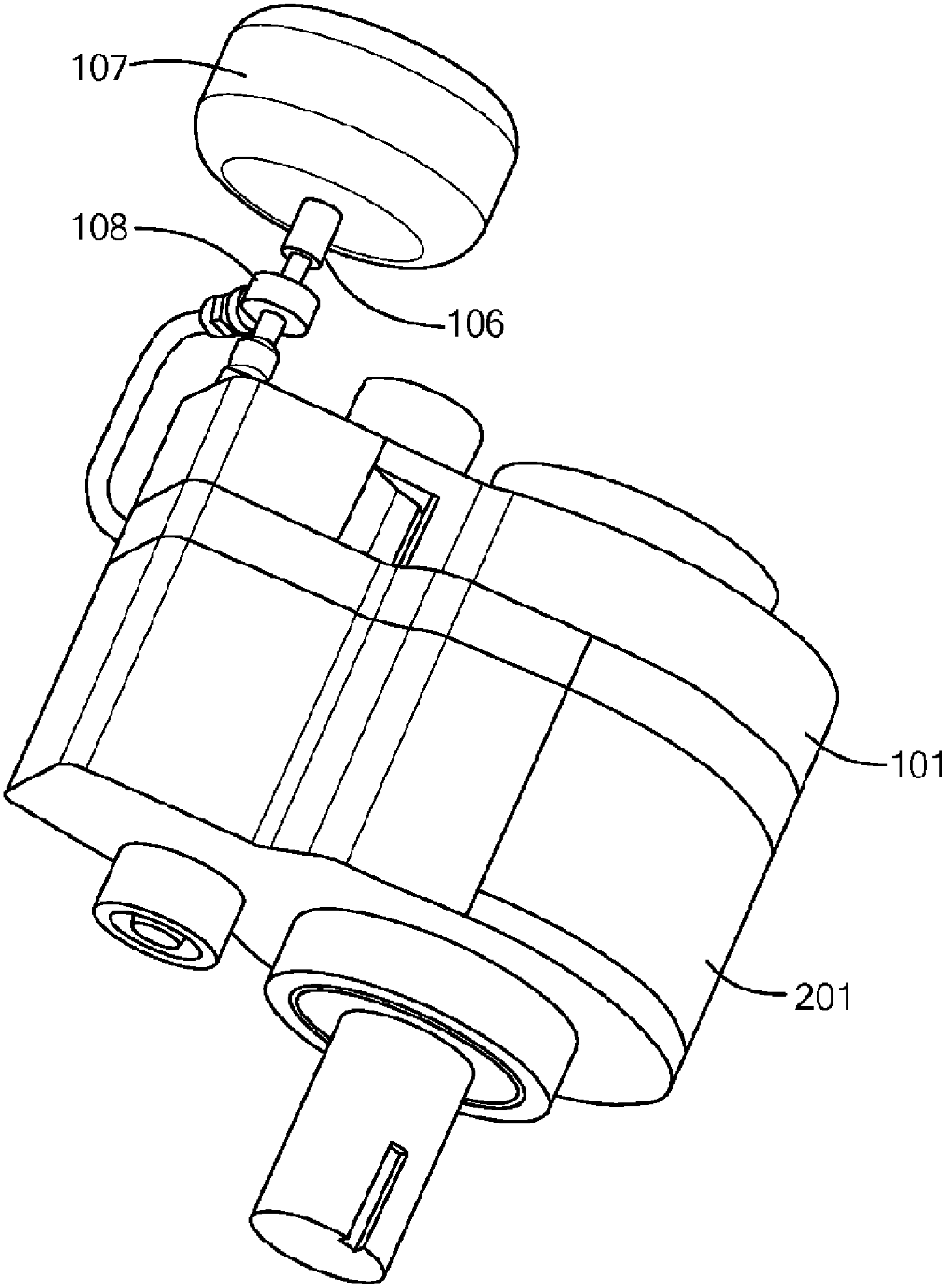
FIG. 2 is a three dimensional representation of an HCRE, according to one specific embodiment.

FIG. 2 shows a single body for both compressor 101 and expander 201. Compressed air 305 exiting from external air tank 107 is optionally conditioned by a conditioner 106, which can reduce the pressure to optimal value and increase/decrease the temperature of the compressed air 305. This temperature increase could be accomplished by using a heat exchanger, by exchanging heat from the exhaust of PGM or by means of special heater. Compressor 101 can be of the rotary, piston, scroll or any other type as long as it is efficient and capable of supplying high compression ratios, on the order of 15 to 30 or above, preferably in a single stage. The exemplary embodiment of this engine will include compressor 101 that works on the same principle as expander 201.

Figure 3:
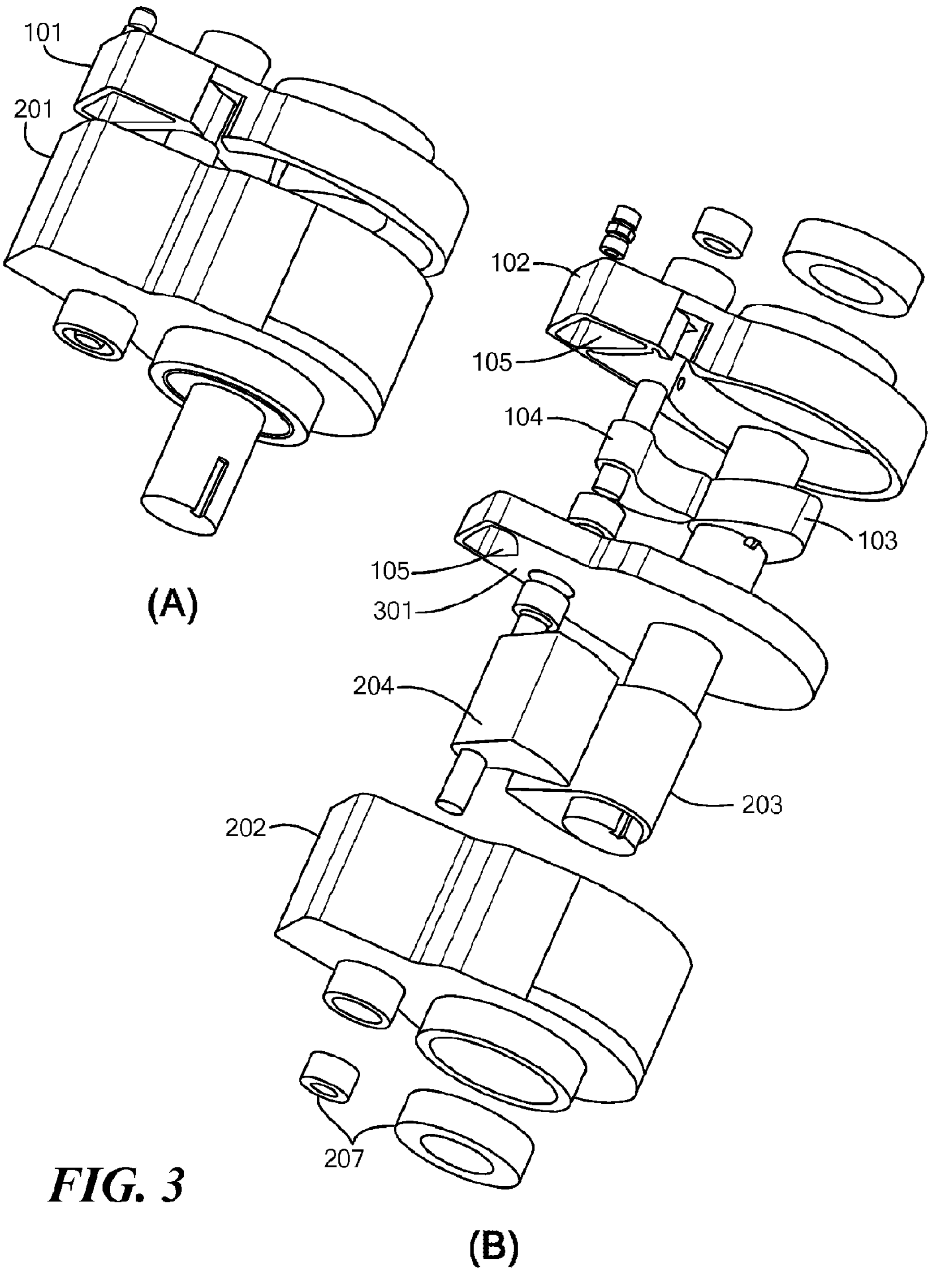
FIGS. 3A-B show various details of the internal structure of an HCRE.
Figure 4:
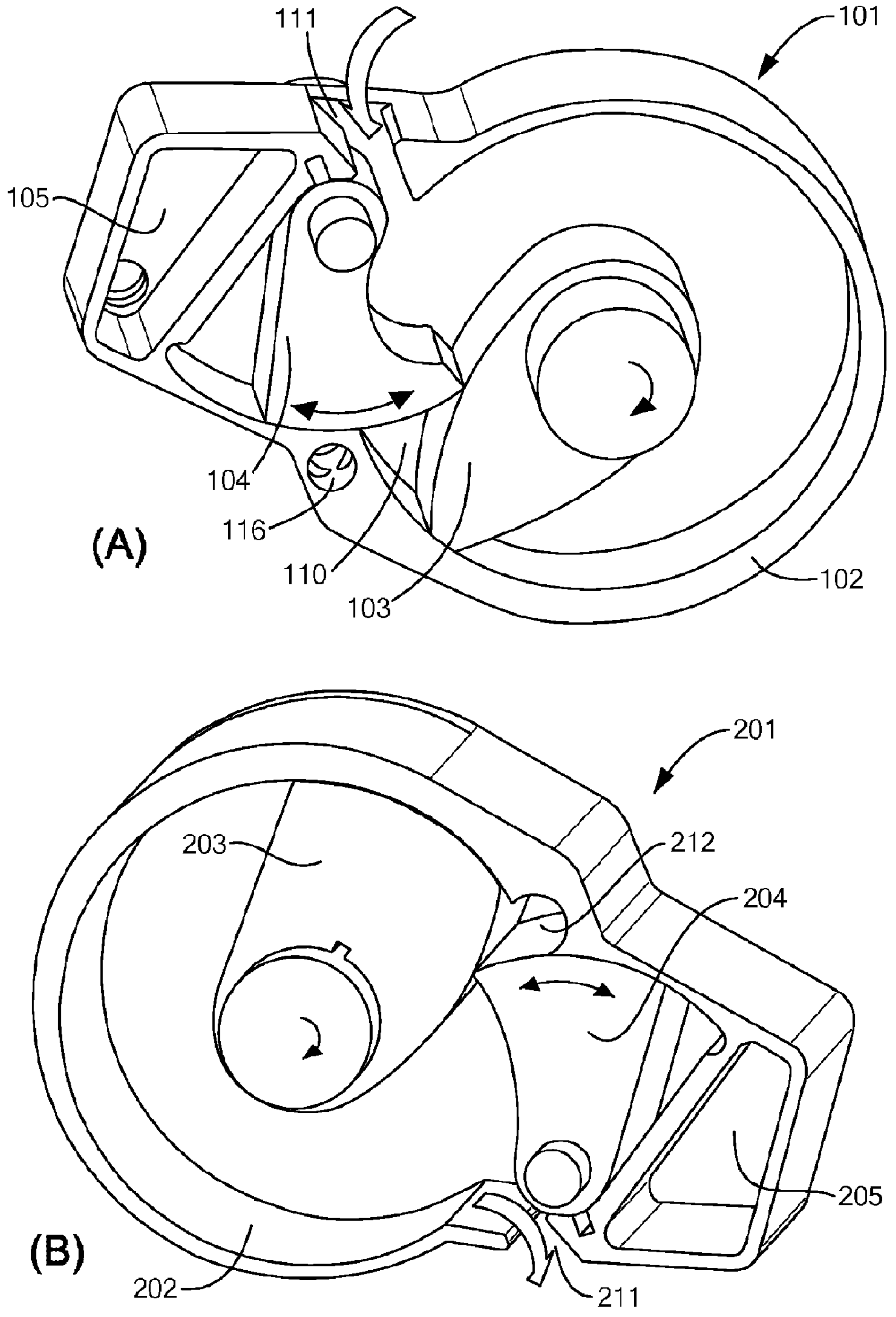
FIGS. 4A-B show various aspects of the internal assembly and functions of the compressor and the expander in an HCRE.

Compressor 101, which is the main element of CAM 100, consists of the following components, shown in FIGS. 3 and 4: a compressor housing 102, a piston-type compressor cam (C-cam) 103, a compressor rocker (C-rocker) 104 serving as a septum, a shaft 250, and bearings 207. Housing 102 contains an air intake port 111 and an exhaust port 116. Bearings 207 could be implemented as "fluid film" (hydrostatic, hydrodynamic or air) bearings, or as permanently lubricated ceramic bearings or conventional bearings. The spaces between housing 102, a separating plate 301 (FIGS. 3-4), C-cam 103 and C-rocker 104 define compressor chambers.

Figure 5:
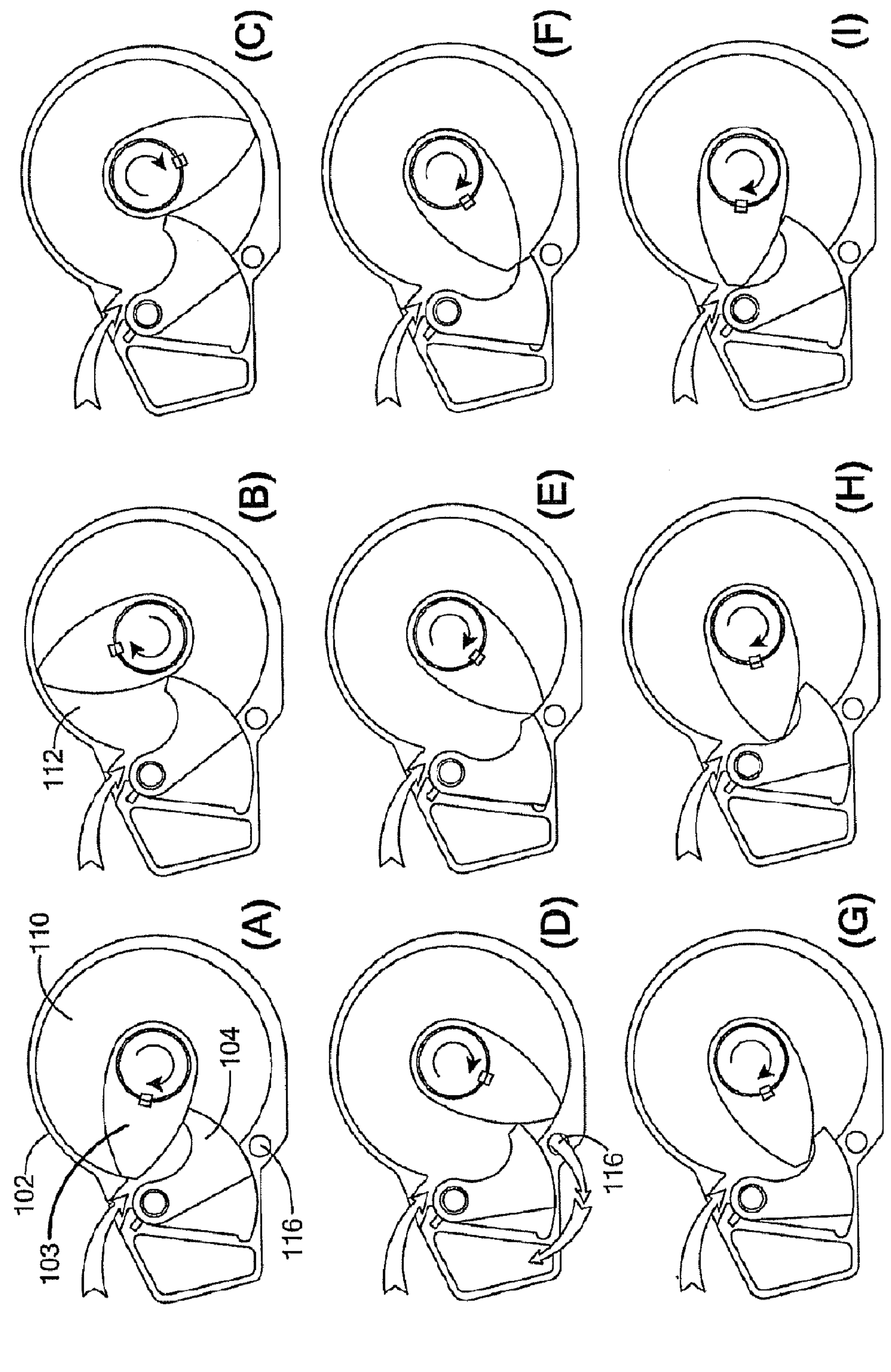
FIG. 5A-I shows the operation of a compressor over one full revolution of the cam.

There are two types of chambers in compressor 101, which are now described with reference to FIG. 5. Intake chamber 112 is defined between C-rocker 104, C-cam 103, and intake port 111 (see FIG. 5A). Compression chamber 110 is defined between C-rocker 104, C-cam 103, and exhaust port 116 (see FIG. 5A). PGM 200 in this case is simply expander 201, consisting of: an expander housing 202, an expander cam (E-cam) 203, an expander rocker (E-rocker) 204, a shaft 250, bearings 207, and valves (not shown) admitting air from compressor 101, air buffer 105, or external air tank 107.

Figure 6:
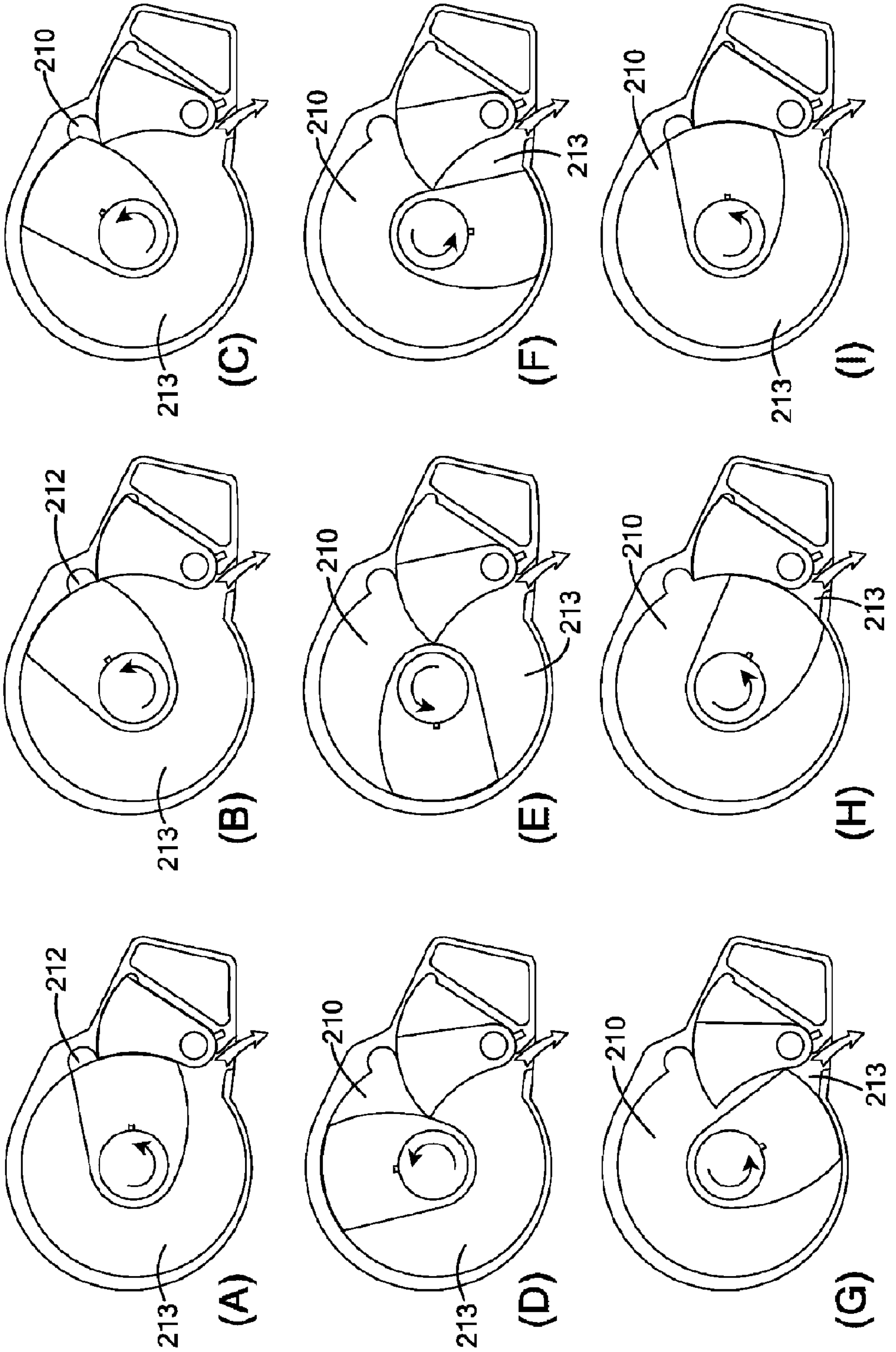
FIG. 6A-I shows the operation of an expander over one full revolution of the cam.

The spaces between housing 202, separating plate 301 (FIGS. 3-4), E-cam 203 and E-rocker 204 define various expander chambers. (In embodiments described below, the E-rocker is a cam follower, and is pivotally mounted. Alternatively the rocker may be slidably mounted.) There are three types of chambers in engine 1000, which are now described with reference to FIG. 6. Combustion chamber (CbC) 212 is defined as an enclosed, minimal and constant volume chamber space (see FIGS. 6A-B). Expansion chamber 210 is defined as an enclosed expanding volume chamber space. The minimal expansion volume is equal to combustion chamber volume, while maximum expansion volume occurs at the moment when pressure within expansion chamber 210 drops to approximately ambient (atmospheric) pressure (FIG. 6H). Exhaust chamber 213 is defined as open to ambient air, and is a contracting volume chamber space.

The operation of compressor 101 is now described with reference to FIGS. 4 and 5. At the beginning of the cycle, compression chamber 110 is formed between C-cam 103 and C-rocker 104 (and housing 102 and separating plate 301, FIG. 3) (FIG. 5A). (In embodiments described below, the C-rocker is a cam follower, and is pivotally mounted. Alternatively the rocker may be slidably mounted.) C-cam 103 rotates within housing 102 such that the size of compression chamber 110 decreases (FIGS. 5B-C). Once the air in compression chamber 110 has reached a certain level of compression, the air starts to transfer through exhaust port 116 into air buffer 105, external air tank 107, or expander 201 (FIG. 5D). As C-cam 103 continues to rotate, it passes exhaust port 116, and the transfer of air completes (FIG. 5E). From this point, no air is left in compression chamber 110 until the cycle completes and a new compression chamber 110 is formed (FIGS. 5G-I). Also note that simultaneously with compression, intake occurs in intake chamber 112. This helps to make engine 1000 very compact.

The operation of expander 201 is now described with reference to FIG. 6. Combustion chamber 212 is formed between E-cam 203 and housing 202 (and separating plate 301). Rotating E-cam 203 continues to define combustion chamber 212 at essentially constant volume (FIGS. 6A-B). The working medium, e.g., compressed air 305 and fuel from fuel supply 304, is injected into combustion chamber 212, spontaneous ignition occurs, combustion starts and continues during the existence of combustion chamber 212 until substantially complete. In some embodiments, some amount of combustion may continue during the expansion phase, albeit at some loss of efficiency. The shaft RPM and the length of large diameter circular segment on E-cam 203 define how long combustion chamber 212 exists. At the moment shown in FIG. 6B, combustion chamber 212 transforms into expansion chamber 210. As E-cam 203 rotates in response to the force exerted by the combusted gases, expansion chamber 210 expands, cooling the gases and reducing pressure in expansion chamber 210 (FIGS. 6C-H). Once E-cam 203 passes the opening of exhaust port 211, expansion ends, and exhaust begins for the combustion gases combusted in this cycle. Note that simultaneously with the expansion stroke, the combusted gases from the previous expansion stroke are in an exhaust chamber 213 coupled to exhaust port 211 to permit exhaust of the combusted gases. As with the similar nature of compressor 101, again, this contributes to compactness of engine 1000.

When air 305 is injected into combustion chamber 212 from air buffer 105, it is initially decompressed (and cooled) and then recompressed (and re-heated) when pressure in the combustion chamber 212 reaches the pressure in air buffer 105. Due to the large pressure difference between the air buffer 005 and compression chamber 212 (which is initially at ambient pressure), the air 305 entering the combustion chamber 212 forms a supersonic swirl which rotates at high rpm. Turbulence formation may be enhanced by use of suitable structures built into the combustion chamber. Description of a Hilsch vortex tube used in carburetor design appears in U.S. Pat. No. 2,650,582, which is hereby incorporated herein by reference. For example, vortex tubes having approximately the same geometry as the combustion chamber 212 have been known to support vortices as high as 1,000,000 rpm, and the input pressure into a vortex tube is only 100 psi as compared to 800-900 psi for an HCRE. Vortex formulation increases turbulence and enhances mixing. The fuel from fuel supply 304 injected simultaneously with the compressed air 305 into a low pressure environment will be dragged into compression chamber 212 by the air swirl, mix very well with the air and evaporate very quickly. When temperature and pressure reaches the auto-ignition point, fuel 304 will ignite within the whole volume (similar to an HCCI engine). At this point, intake of the working medium of compressed air 305 and fuel from fuel supply 304 stops.

Figure 7:
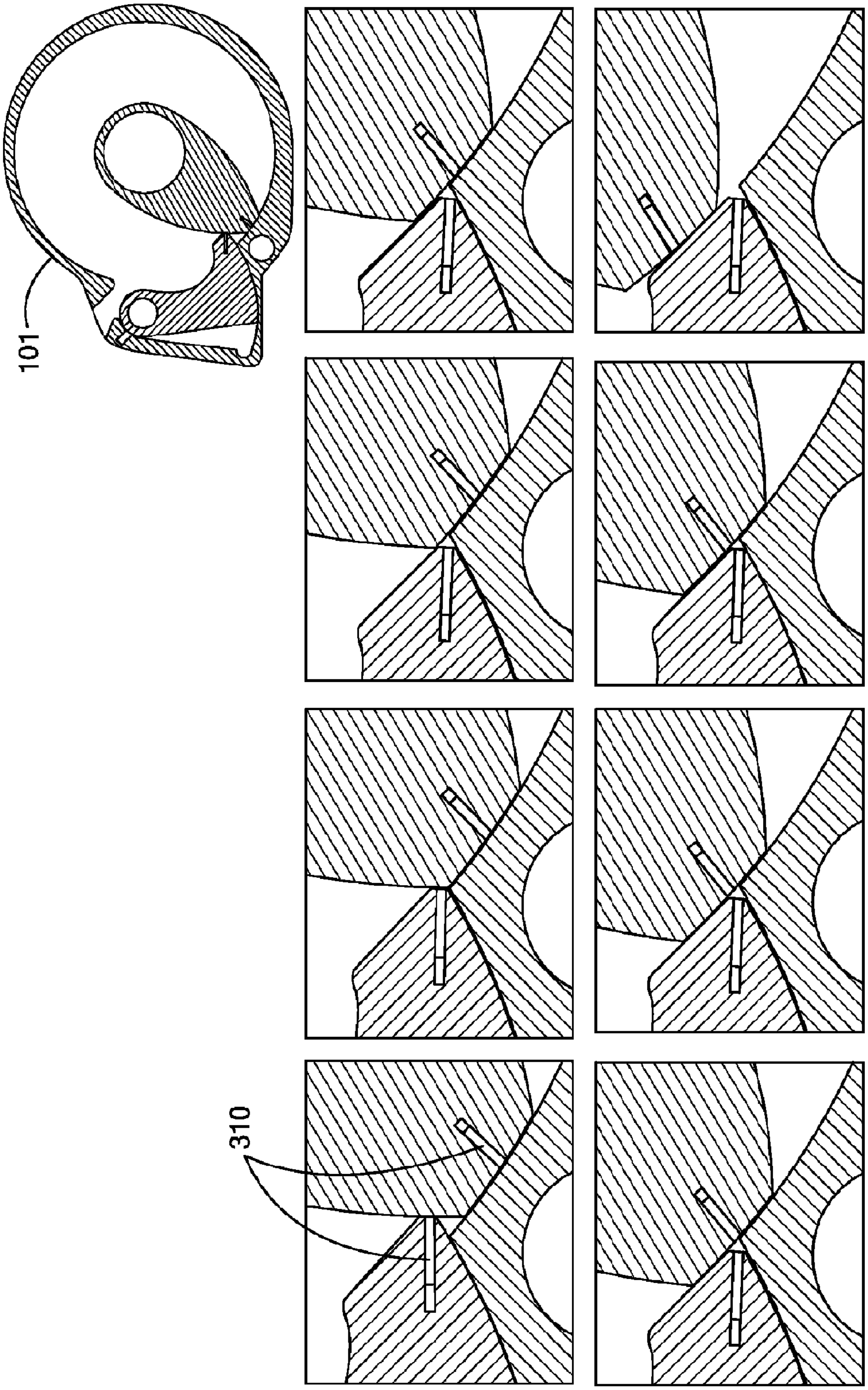
FIG. 7 shows a cam passing across the edge of a rocker.

As explained above, various chambers are formed between the housings 102, 202, separating plate 301, cams, 103, 203 and rockers 104, 204. It is advantageous for efficient operation of engine 1000 to have tight seals between all these components. Wankel-type face and apex seals 310, as shown in operation in FIG. 7, could be used on the cams 103, 203 and rockers 104, 204, while fluidic-type and liquid seals are also feasible. It should be noted that the net force on the surface of the rockers 104, 204 when exposed to high pressure gases passes through the center of rotation of the rockers 104, 204 and, therefore, does not influence the motion of the rockers 104, 204. Therefore, the rockers 104, 204 should be constantly pressed against the cams 103, 203 to eliminate leakage of gases from the chambers. The simplest way to apply pressure against the rockers 104, 204 is by a suitable torsion or constant force spring. Or if Wankel-type apex seals are used, the rockers 104, 204 should be kept relatively small—on the order of 0.001" to 0.003" separation with the cams 103, 203. Alternatively, controlled air pressure on the opposite side of the rockers 104, 204, or controlled motion of the rockers 104, 204 by a separate electric solenoid or motor or external cam could be used as well. This may present an opportunity to have the rockers 104, 204 exert very little pressure on the cams 103, 203, thus reducing or eliminating wear.

Engine 1000 may be cooled by conventional means, i.e., passing water 306 through stationary components in a water jacket and air cooling housing walls 102, 202. Alternatively, engine 1000 can be cooled by passing water 306 through the channels formed between various components of engine 1000, which see lots of heat. Finally cooling may be achieved in whole or in part by running at less than 100 percent duty cycle, as explained below in connection with the "digital mode of operation".

An HCRE engine as in embodiments of the present invention differs in significant ways from a conventional HCCI cycle engine. For example, modern HCCI engines experience problems achieving dynamic operation of the engine. The control system must change the conditions that induce combustion. At present, very complicated, expensive and not always reliable controls are used to effect marginal variation of engine performance in response to varying load conditions. The variables under control to induce combustion include the compression ratio, the inducted gas temperature, the inducted gas pressure, and the quantity of retained or re-inducted exhaust.

In HCRE, additional control means exist that do not require complicated control mechanisms, referred to as combustion stimulation means (CSM). CSM are the measures taken to stimulate or induce the combustion of a conditioned working medium of air and fuel within combustion chamber 212, including, but not limited to, one or more of the following: the pressure of the conditioned working medium, the temperature of the conditioned working medium, the concentration of exhaust gas recirculation (EGR) within the conditioned working medium, the concentration of water vapors within the conditioned working medium, catalytic surfaces within combustion chamber 212 (i.e. walls covered with a catalyst or a catalyst placed within combustion chamber 212), a catalytic burner placed within combustion chamber 212 (such as nickel mesh, or ceramic foam), high combustion chamber wall temperature, a tungsten wire heater inside combustion chamber 212, re-inducted exhaust 307 (which alone or in mixture with water vapor might induce a water shift reaction within fuel from fuel supply 304 as a thermo-chemical recuperator), and additional fuel injected or introduced into combustion chamber 212. This additional fuel may be, but does not have to be, the same as fuel from fuel supply 304, i.e. fuel produced by dissociation of water (steam) molecules in the presence of a catalyst and possibly assisted by an electric spark discharge into hydrogen and oxygen. This can be produced by electrolysis of water (or steam) within the confines of combustion chamber 212 itself utilizing the heat of engine 1000. The heat generated during the air/fuel mixture compression may supply a significant part of the energy needed for such dissociation. Hydrogen generated in the process of dissociation is used during combustion. Thus, the net effect of this process is partial recovery of the heat of compression.

As mentioned above, engines running under HCCI cycles are notoriously difficult to control, especially under part-load. While standard means of control, such as regulating fuel amount, pressure, temperature, amount of EGR, etc. are still available, a more elegant way to control HCRE (which will be referred to as "digital mode of operation") is available: to run every cycle at full load, but sometimes skip cycles. For example, skipping three out of each eight cycles will enable running under ⅝th of full power, skipping six out of each eight cycles will enable running under ¼ of full power, and so on.

To operate in the digital mode, and in particular to skip one or more cycles, it is possible to cut off both the compressed air 305 and the fuel supply 304 or to cut off only the fuel supply 304. As described previously in connection with FIG. 1, fuel from the fuel supply 304 is gated by fuel valve assembly 318, which is controlled by controller 319, so as to cause cut off of the fuel supply. Similarly, air from the compressed air module 100 is gated air valve assembly 118, which is also controlled by controller 319. The controller may additionally be coupled to receive an engine load signal. Such a signal may be derived by a variety of methods; under one method, engine speed is monitored in relation to fuel consumption or in relation to an engine speed directive (such as accelerator pedal position in an automobile). Under light load conditions, evidenced by the engine load signal, the controller may be configured to run the engine at a duty cycle less than 100%, so that the engine skips the combustion portion of the cycle after a regular number of cycles. Thus the engine load signal to the controller causes the controller to cut of fuel to the expander after a regular number of cycles. As an example, in one mode, the engine may operate with fuel to the expander cut off every fourth cycle, for approximately a 25% reduction in power and in fuel consumption. In another mode, the engine may operate with fuel to the expander cut off every other cycle, for approximately a 50% reduction in power and in fuel consumption. In the case when fuel is cut off from the expander, the compressed air 305 furnished by compressor 101 will then expand in expander 201 without much loss in energy, since compressed air 305 will be heated by the combustion chamber walls during the idle time in combustion chamber 212. Cycles of the engine operating under the latter case, when fuel supply 304 is cut off, will be referred to as "off-cycles," as opposed to "on-cycles" when both air and fuel are delivered and combustion events occur. An additional effect of this operation is that it will cool the walls of combustion chamber 212 and the whole engine 1000. Since it is common for an engine to operate at peak loads for only a small fraction of its operating life, this feature would make it possible to operate such an engine without cooling at all, i.e. cooling would naturally occur during these "off-cycles". To operate such an engine at maximum power (when the "off-cycles" reduce towards zero, the engine 1000 can initially be oversized and not allowed to operate normally at more than some maximum preset power level, e.g., 80% (i.e., 80% duty cycle). The remaining 20% of power-duty cycle is used for cooling. This approach would somewhat increase the size of the expander 201, but elimination of bulky cooling system components can lead to overall reduction in engine size. With such an approach, in a further embodiment, the controller may receive an engine temperature signal and use such a signal to place a limit on the maximum duty cycle; using temperature to limit maximum duty cycle may permit momentary uses of a larger duty cycle under conditions of a temporarily high demand for peak engine power. If air is cut off during the off cycles, it will typically be necessary to vent the working chamber through a vent valve or other suitable arrangement.

In a related embodiment, a plurality of expanders may be employed. In such a case, a separate valve assembly for each expander may be employed, although the valve assemblies may be controlled by a common controller 319. The expanders may be mounted on a common shaft at differing angular orientations, so that they operate out of phase with one another in order to smooth out power generation over the course of a shaft rotation. Alternatively, for example, a pair of expanders may be mounted at a common angular orientation but operated with alternate off cycles, any given time one expander is generating power while the other expander has an off cycle, and in this way, the overall engine will exhibit a generally balanced mode of operation. A flywheel may also be used to smooth out engine operation.

If engine 1000 is equipped with external tank 107 and clutches 261 (see FIG. 11), compressor 101 may be disconnected for a short while, thus allowing about a 25% power boost, since engine 1000 will not spend this amount of energy for the compression of air 303. Alternatively, braking energy could be partially recovered by disconnecting engine 1000 and applying the momentum of a vehicle to turn wheels, which in turn will turn compressor 101, which in turn will compress air 303 and push it into external air tank 107 through the valve. Moreover, due to small size of both compressor 101 and expander 201, it would be possible to locate them in part or even entirely within the wheel well. So, the front wheel wells could contain expanders, and the rear wheel wells could contain compressors. In such embodiments, there would not need to be a shaft connecting expanders and compressors, this function would be executed by the road. This could create very compact and flexible arrangements for vehicle design as well as allow certain degree of redundancy.

External tank 107 can also start engine 1000 instead of or in addition to an electrical starter, or expander 201 can serve as an air motor running on compressed air 305 or liquid nitrogen.

From the first law of thermodynamics it follows that the less heat is rejected to the environment, the more heat can be converted into useful work. Heat is rejected from an internal combustion engine into the environment via two mechanisms. One is thermodynamic losses due to hot exhaust gases, and the other is engineering losses, due to the need to cool engine components. Low heat rejection (LHR) engines use high temperature components to address the second of these.

Theoretically, LHR engines should exhibit higher thermodynamic efficiencies. In practice, however, the results are inconclusive at best and opposite to what is expected at worst. This in because incomplete combustion due to higher engine temperature forces premature ignition before the fuel has time to mix with the air. Also, higher combustion temperatures result in higher exhaust temperatures. Thus, decreased engineering loss is accomplished at the cost of increased thermodynamic loss.

The design of engine 1000 may present us with an opportunity to address both components of loss at once. The approach includes but is not limited to some or all of the following measures.

Figure 28:
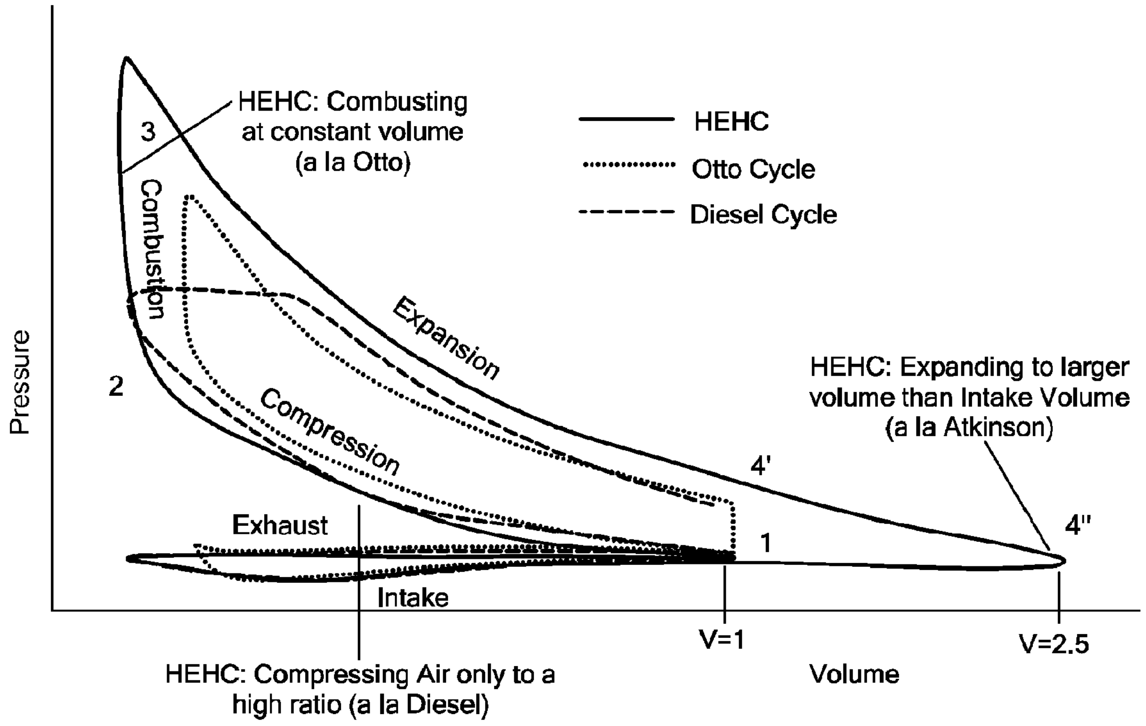
FIG. 28 is a graph comparing the pressure-volume characteristics of the high-efficiency hybrid cycle to the Otto and Diesel cycles.
Figure 29:
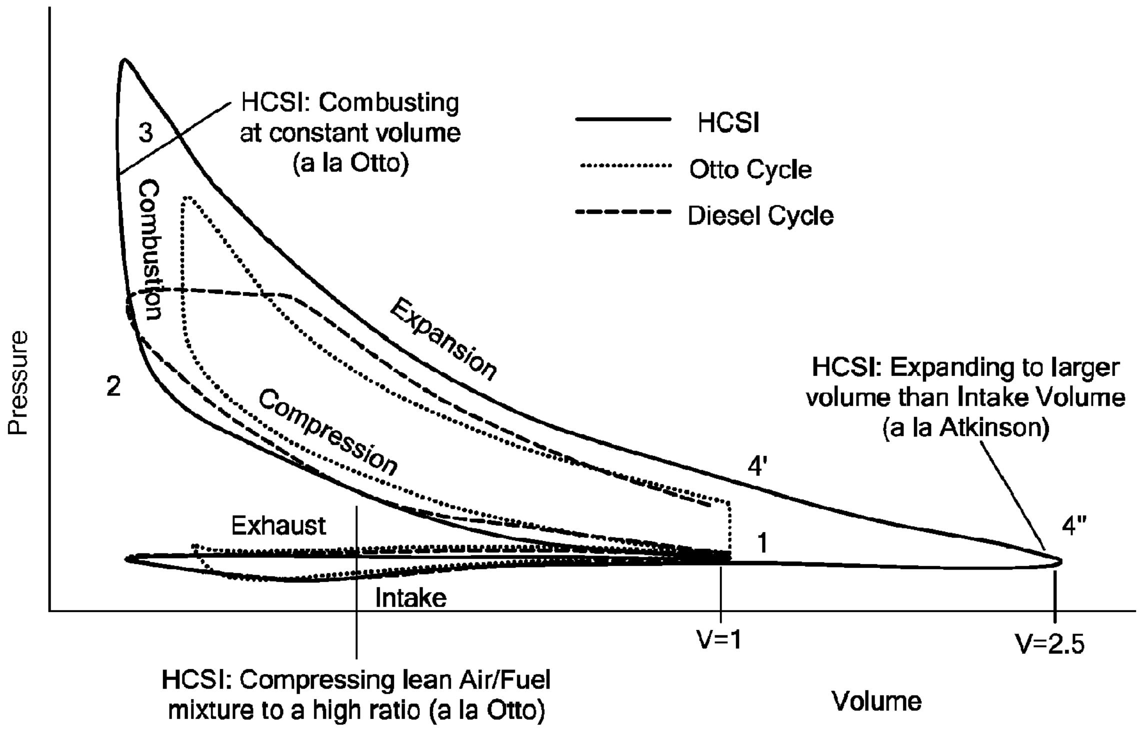
FIG. 29 is a graph comparing the pressure-volume characteristics of the homogenous charge stimulated ignition cycle to the Otto and Diesel cycles.

One option is thermally insulating the engine from the environment by using ceramic components, various coatings, or other insulation materials. Another option is suppressing the temperature increase of components (housing 102, 202, bearings 207, cover 216 and blade 214) by removing extra heat from these components. Unlike conventional engines which remove heat from the walls and transfer it to the environment through coolant and a heat exchanger (radiator), engine 1000 could be cooled by injecting water 306 between the components. For an example of how water 306, shown in FIG. 1, could be injected to form a water seal, see FIG. 20B, where the water seal is shown as item 311. Water 306 supplied to these components at very high pressure will turn into steam, which will escape into expansion chamber 210 and aid combustion products in the expansion process, thus increasing the efficiency of engine 1000. Thus we accomplish partial recovery of thermal cooling losses, while simultaneously lowering the temperature of exhaust gases 307. The water vapors could be recovered through conventional condenser 300, shown in FIG. 1. However, this may require large space and associated costs (e.g. because it has to be corrosion resistant). Alternatively, condensing may be accomplished via a centrifugal condenser. Another option is extending the expansion process further until atmospheric pressure is reached, as shown in FIGS. 28-29. We lower the temperature of the exhaust gases 307 further, thus reducing the thermodynamic component of the losses. The net result is that we expect engine 1000 to exhibit much higher efficiencies than conventional engines.

Many variations on the design of the exemplary embodiment are possible and apparent to those skilled in the art. Examples of various embodiments of the present invention are described below.

Figure 8:
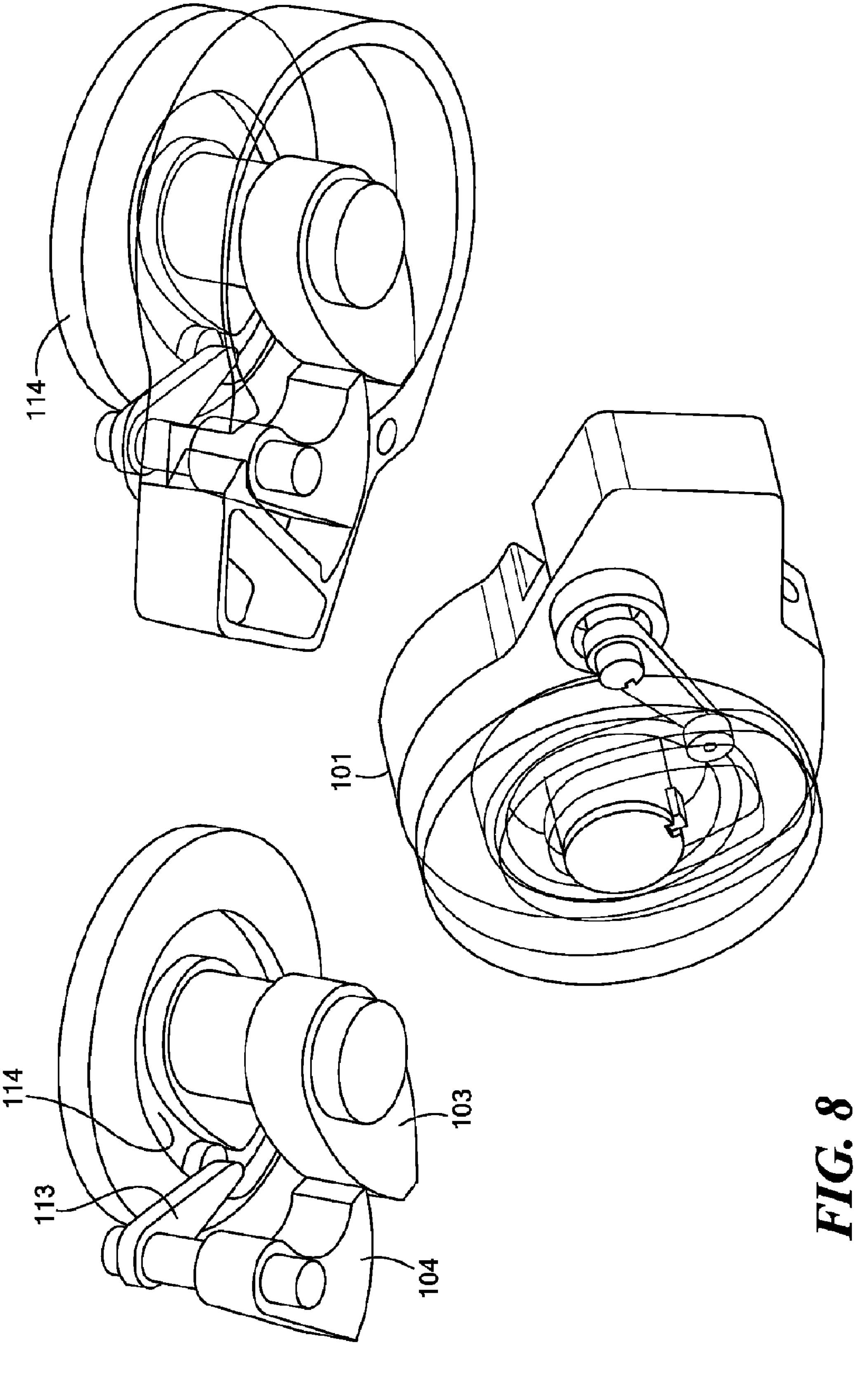
FIG. 8 shows a groove cam that can be used to regulate the action of a rocker in an alternate embodiment.
Figure 9:
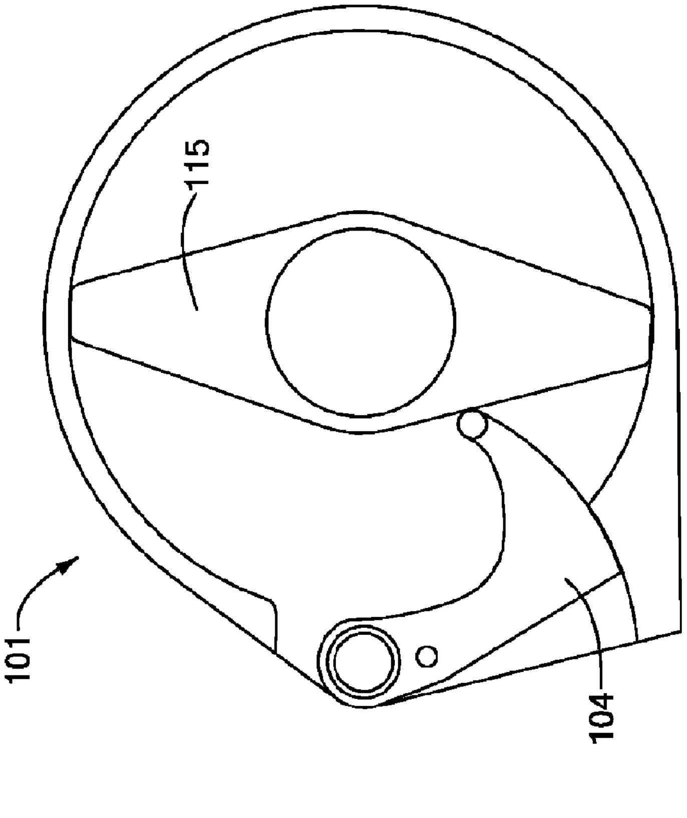
FIG. 9 gives the layout of a two-sided cam that can be used in an alternate embodiment.

Cams 103, 203 may be implemented according to several alternatives. Cams 103, 203 may be implemented in various shapes, the cylindrical surface could be replaced with conical, semi-spherical, or curved surfaces. The functions of cams 103, 203 can be fulfilled by using variations such as groove-cams 114, shown in FIG. 8, in which a cam-follower 113 tracks a path through a groove in a groove-cam 114, and the action of a shaft is regulated thereby. Also, the single-cam design could be replaced by a dual-cam design, such as the one shown in FIG. 9. The design variation shown in FIG. 9 employs a two-sided cam 115 and a single rocker 104. Variations on this setup are possible including multiple rockers, as well.

Figure 10:
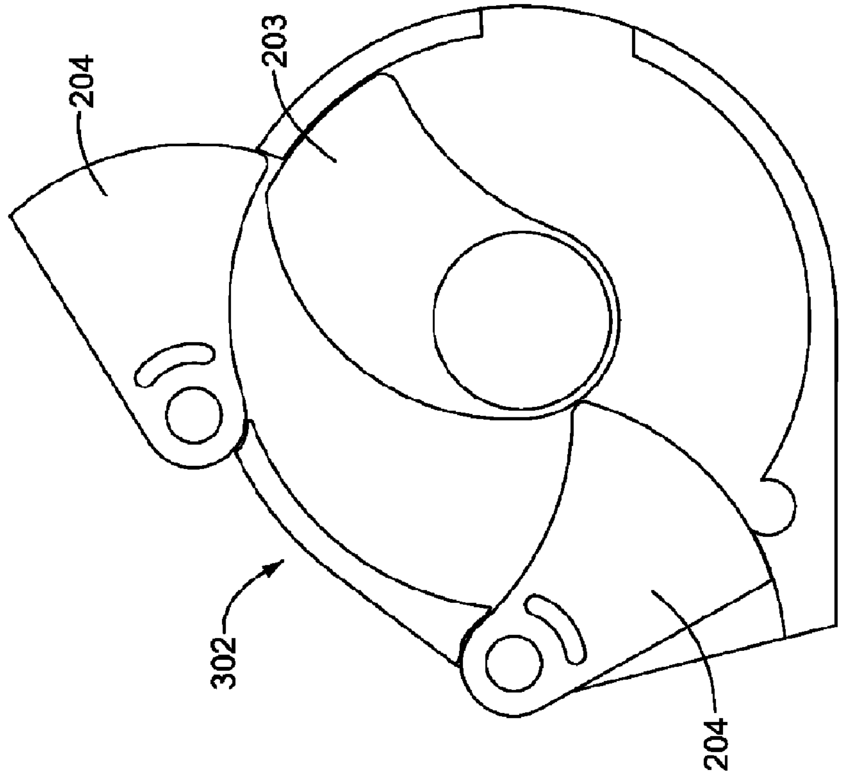
FIG. 10 gives the layout of a dual-rocker arrangement that can be used in an alternate embodiment.

It is possible to build a combination compressor/expander 302 (see FIG. 10), according to the principles of operation used in an exemplary embodiment such that both functions exist in a single body rather than two separate bodies. One such possible design variation is shown in FIG. 10 using a single rotating cam 203 and two rockers 204. Other designs could include three rockers, multiple cams, or a combination of these variations.

Figure 26:
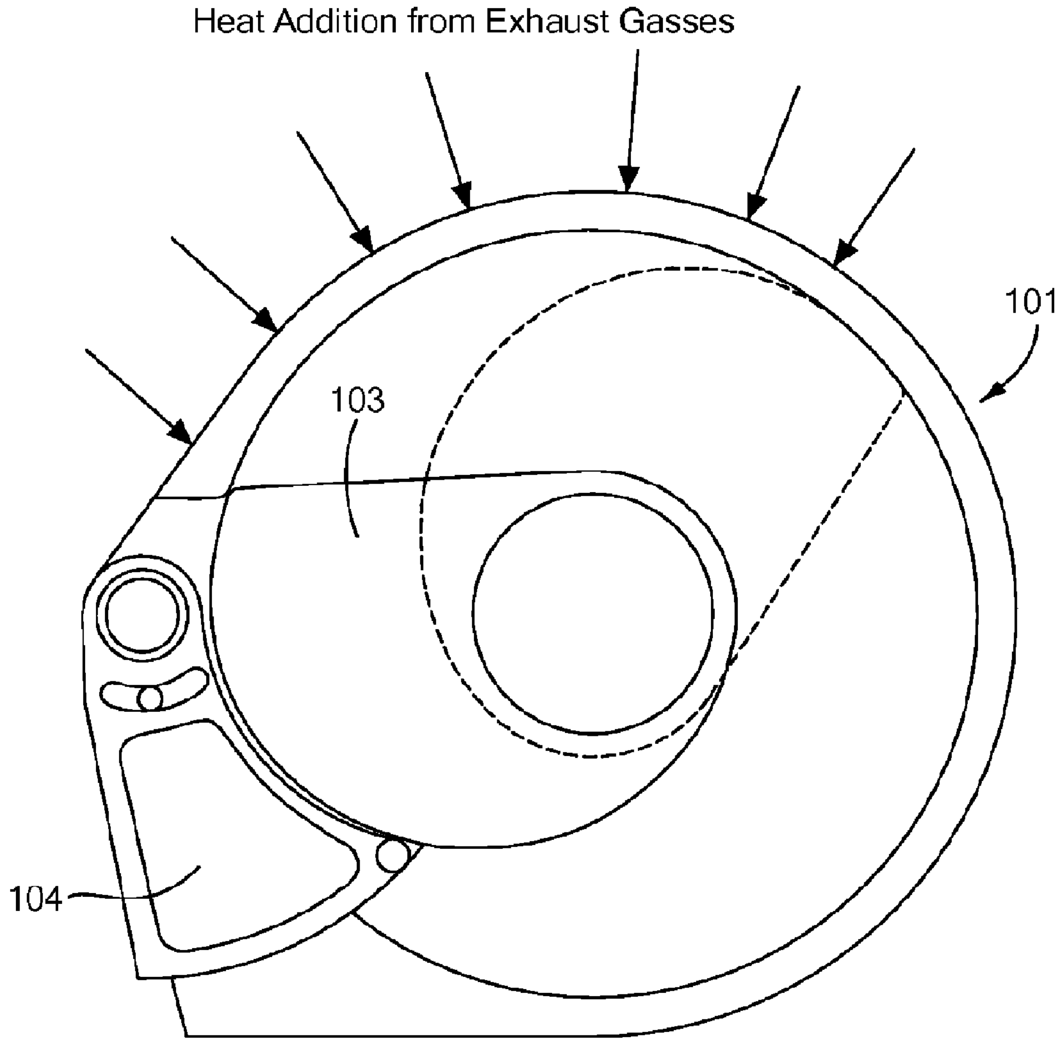
FIG. 26 shows a technique for recycling heat from exhaust gases, according to an alternate embodiment.
Figure 27:
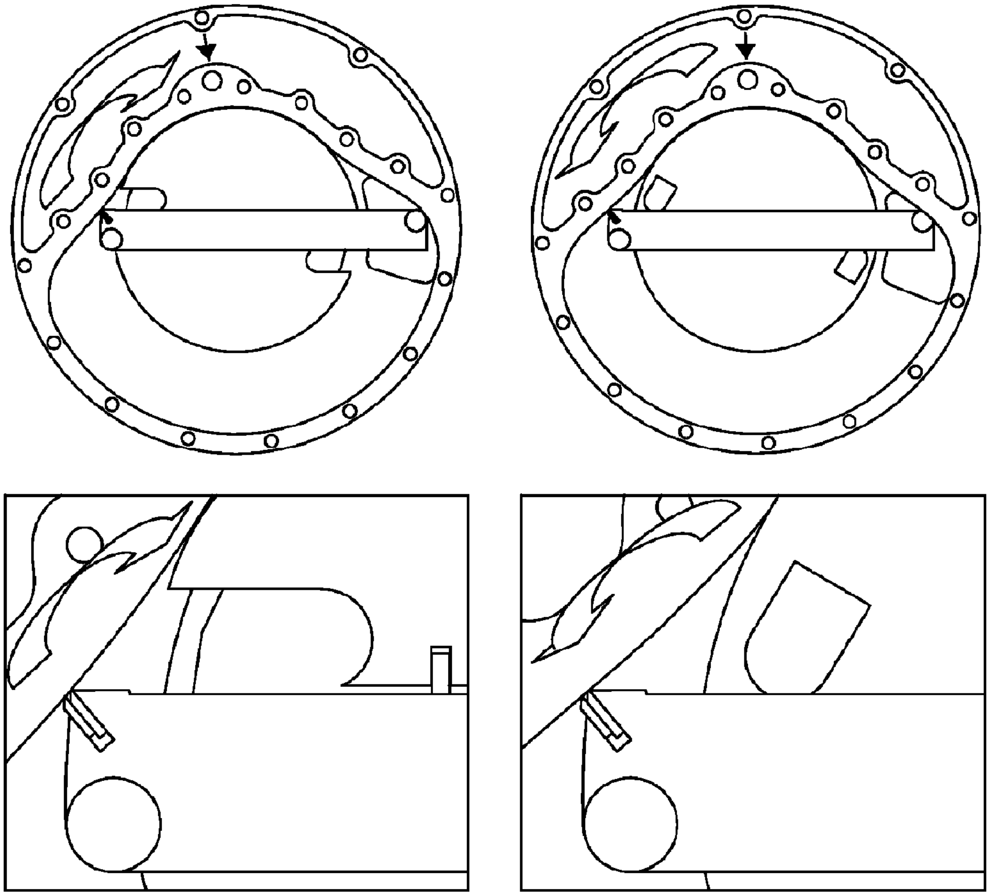
FIG. 27A-B shows the sealing arrangement according to an alternate embodiment using a sliding blade.

It can be shown that, unlike compressor 101, the efficiency of engine 1000 is increased if air 303 is heated during the compression process, rather than cooled. So to increase the efficiency, some of the heat from the exhaust gases 307 could be transferred to air 303 being compressed. It has to be done intermittently from the point in time when cam 103 closes intake port 111 to the point in space when temperature due to compression reaches the maximum temperature of exhaust gases 307 (minus ~20° C.) (see FIG. 26). In addition, exhaust gases 307 (at ~800° K) could be used to cool combustion chamber 212, where temperature during combustion could be higher than 2600° K (which is why ceramic walls or coating should be used in combustion chamber 212). This temperature has to be reduced to enable long engine operation. This could be accomplished by a conventional water shroud, by water injection into combustion chamber 212 and/or expansion chamber 210, or by gas cooling, utilizing exhaust gases 307 as a cooling medium. Exhaust gases 307 would increase the temperature to ~1200°-1300° K. This would make utilization of exhaust gas heat to heat air 303 during the compression stroke much more attractive. Alternatively, or in addition to the above, cooling could also be accomplished by utilizing the “off-cycle” WM expansion as discussed above. The additional effect of cooling utilizing the digital mode of operation is that engineering heat losses (i.e. due to the need to cool components for structural purposes) will be reduced by utilization of this heat during the “off-cycle”.

Given the extreme heat felt by combustion chamber 212, greater cooling efforts could be undertaken near combustion chamber 212 and lesser cooling at the end of expansion. Similarly, as much higher pressures exist in the vicinity of combustion chamber 212, that is the place where the walls should be the thickest. Other possible variations also include a sliding rocker with an eccentric disk cam, and a fixed and stationary combustion chamber. Still another variation is to locate the combustion chambers within the separating plate or the rocker, or some combination of thereof.

Figure 11:
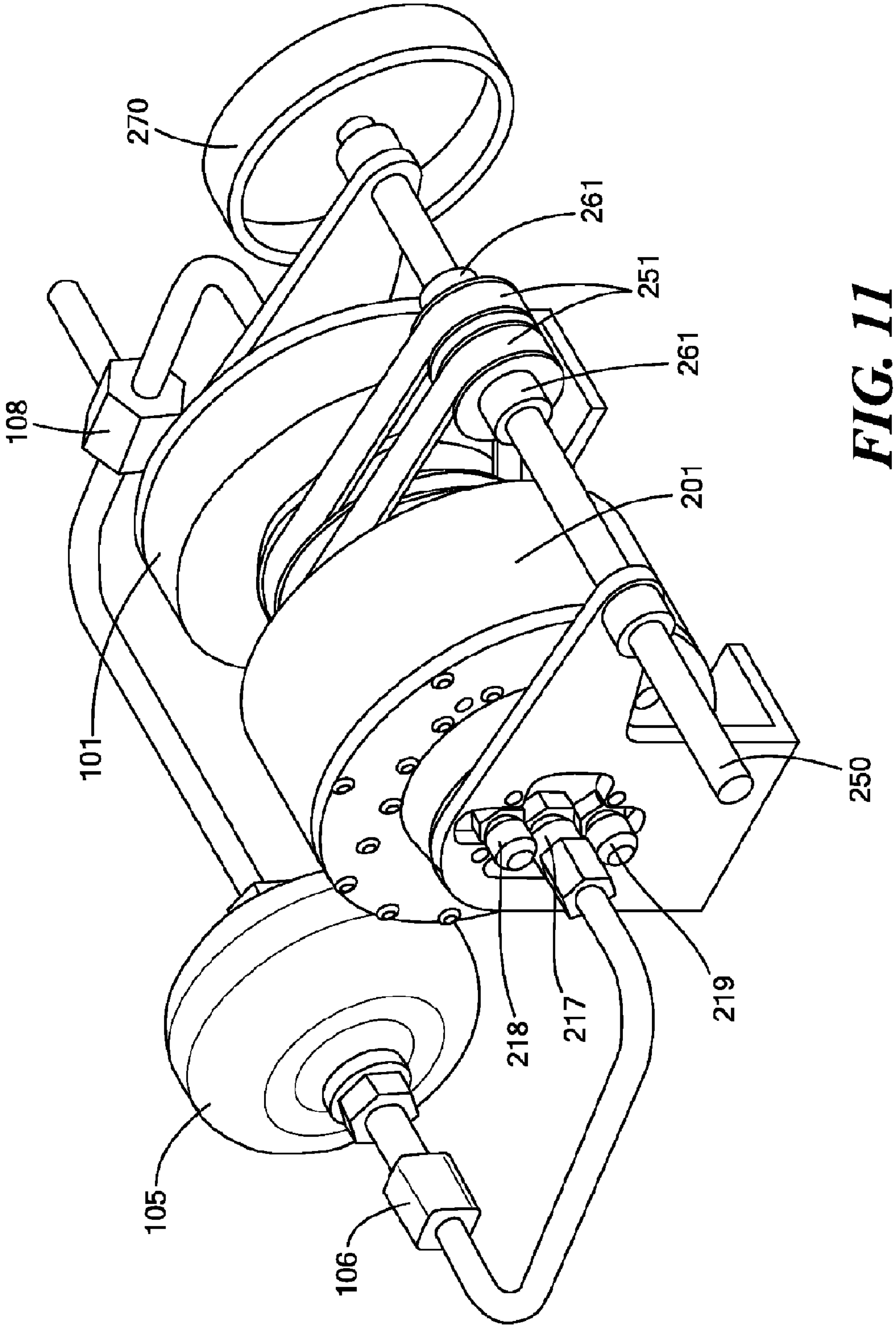
FIG. 11 is a three dimensional representation of an HCRE, according to an alternate embodiment using a sliding blade.

One variation of the basic engine design showing the variety of ways the design ideas can be implemented is a design using a sliding blade 214 (see FIG. 14) in place of the standard rotating cam. FIG. 11 shows what such a design might look like fully assembled. In this configuration, compressor 101 is driven by a belt drive 251, via optional clutch 261. Alternatively, it can be driven by gears, chain drive or any other suitable means, including directly by PGM 200. If clutch 261 is used, compressor 101 can be turned on and off as needed. For example, if engine 1000 is being used in a vehicle, then to recover the braking energy of the vehicle, one can turn off PGM 200 through clutch 261, and run compressor 101 only from the rotating wheels of the vehicle or the flywheel. Air 303 compressed by compressor 101 will be directed to external tank 107, via 3-way valve 108. Alternatively, when a car employing an embodiment herein requires more power, compressor 101 is deactivated completely via clutch 261, and compressed air 305, stored in external tank 107, is used for operation of PGM 200. This will afford maximum flexibility and power management to the vehicle.

The implementation of a PGM 200 according to a sliding blade embodiment is now described with reference to FIGS. 12 and 13. In the implementation shown the housing walls 221 of an expander 222 rotate around a stationary, internal hub 220. Alternatively, other configurations may employ a rotating hub and stationary housing. PGM 200 includes housing 221, a cover 216, hub 220 (consisting of two semi-cylindrical guides 215, and two bearings 207), a sliding blade assembly 214, an air inlet port 217 (serving as an inlet port), a water inlet fitting 218, and a water outlet fitting 219.

Figure 13:
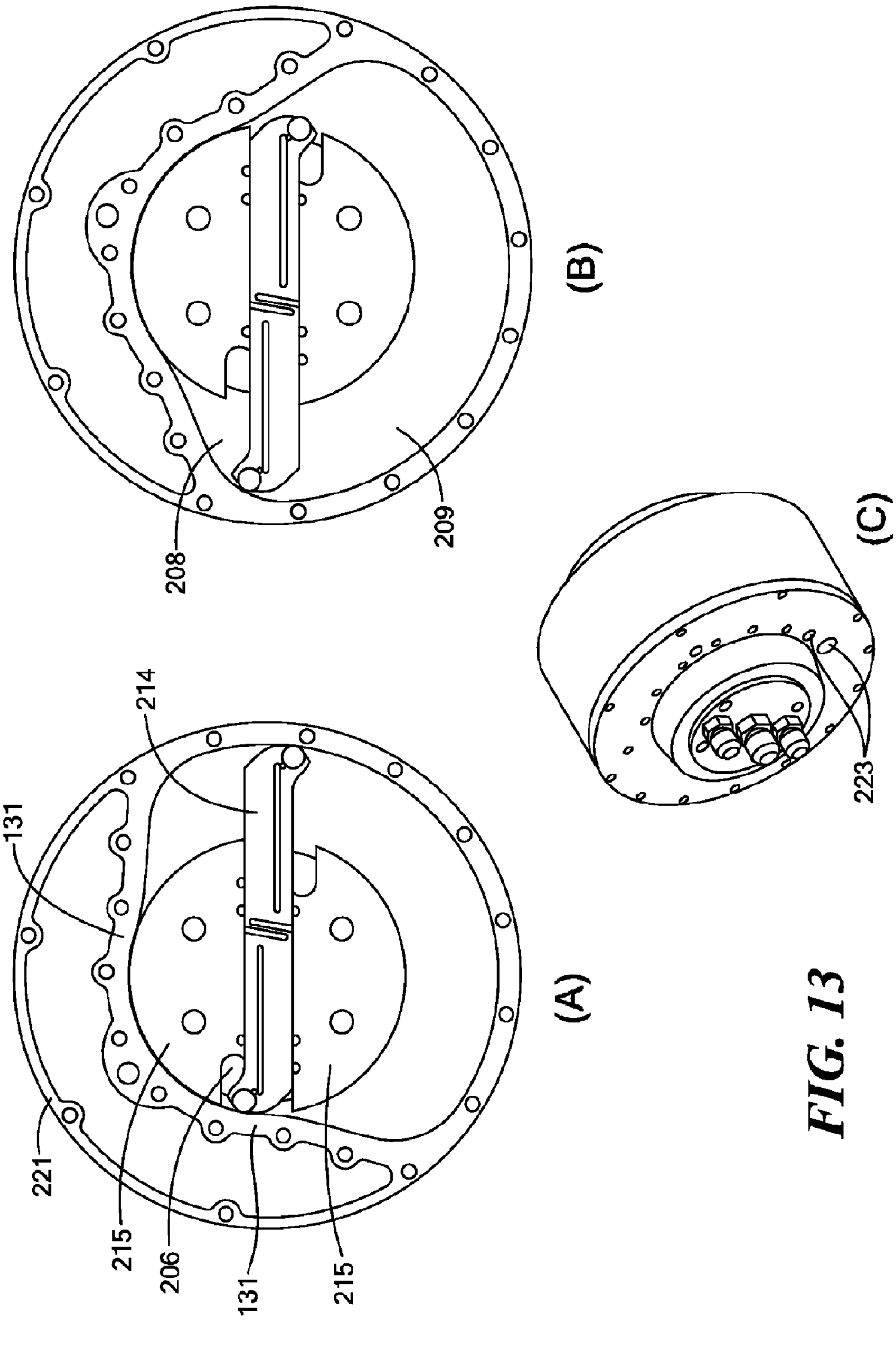
FIG. 13A-C shows the functional layout of an expander in an HCRE, according to an alternate embodiment using a sliding blade.
Figure 14:
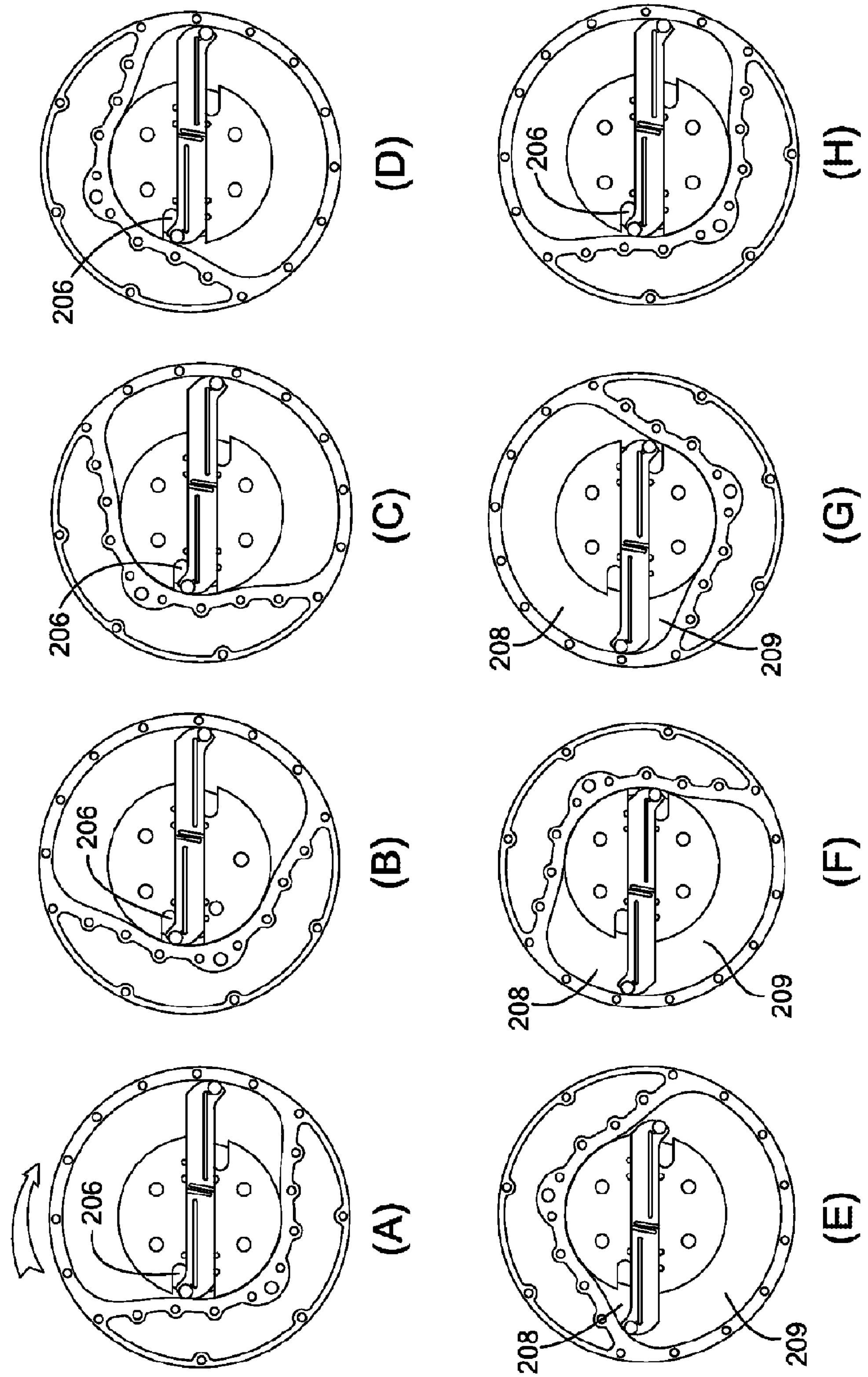
FIG. 14A-H shows the operation of an expander in an HCRE over one full revolution of the hub, according to an alternate embodiment using a sliding blade.

The spaces between hub 220, housing walls 221, sliding blade assembly 214, bearings 207, and cover 216 define engine chambers. There are three types of chambers, as shown in FIG. 13. As in the exemplary embodiment, these chambers are combustion chamber 206, expansion chamber 208, and exhaust chamber 209. (An exhaust port, not shown, is coupled to the exhaust chamber 209.) It can be seen in this figure that the housing includes a first interior circular wall portion, marked as item 131—the portion lies generally between the two locations identified by the reference lines associated with reference number 131; this portion maintains sealing contact with the hub in the course of the housing's rotation around the hub. The housing also includes a second interior portion contiguous with the first interior wall portion. The portions define, in combination with the blade and the hub, a working chamber (namely a combustion chamber 206 and an expansion chamber 208) that is isolated from the air inlet port and an exhaust port at relevant portions of the engine cycle, as indicated in FIGS. 13(A) and 13(B) and FIG. 14.

The operation of expander 222 in this embodiment is now described with reference to FIG. 14. The cycle begins in FIG. 14A, when an enclosure is being formed by rotating housing walls 221 to form combustion chamber 206. In FIGS. 14B-D combustion chamber 206 is already formed. Combustion chamber 206 exists during the timeframe when sliding blade assembly 214, which runs simultaneously on two constant radius segments within housing walls 221, remains stationary with respect to semi-cylindrical guides 215, which together with the cylindrical segment of housing walls 221 and bearings 207, define the volume of combustion chamber 206. Referring to FIG. 12, when left hand side of sliding blade assembly 214 exits constant radius segment, expansion chamber 208 is formed. In FIGS. 14E-G expansion stroke starts in expansion chamber 208 and, simultaneously, exhaust stroke starts in exhaust chamber 209.

A working medium (WM), such as air 305, is admitted to combustion chamber 206 through an electronically controlled valve (not shown but corresponding to a portion of air valve assembly 118), located within bearing 207. Alternatively, or in addition to electronically controlled valve, WM gets to combustion chamber 206 through a one way valve (not shown but corresponding to a portion of air valve assembly

118) located within bearing 207. When combustion starts and pressure increases rapidly, the one way valve closes, trapping air 305 inside combustion chamber 206.

If conditioned air is used, fuel from fuel supply 304 is injected by fuel injectors located within bearing 207. If conditioned air or air/fuel mixture is used, the combustion occurs spontaneously within combustion chamber 206 triggered by a combustion stimulation means. If a conditioned air/fuel mixture is used, since the air/fuel mixture is lean as with any homogenous charge compression ignition (HCCI) cycle, the amount of fuel from fuel supply 304 can, to a certain degree, control the power level of engine 1000. However, such a control is unreliable and very complex. All modern engines running the HCCI cycle suffer from this problem. In a further embodiment, in addition or instead of the above control scheme, to run engine 1000 at full power during each cycle, i.e. run under a constant air/fuel mix. The power level of engine 1000 will be controlled, however, by skipping some of the cycles, e.g., executing the digital mode of operation.

Depending on the temperature of housing walls 221, water vapor content and the amount of exhaust gases 207 remaining within combustion chamber 206 from the previous cycle, etc., the combustion event may occur at different positions of sliding blade assembly 214 with respect to housing walls 221, but always will start within combustion chamber 206. Due to the fact that combustion event is very rapid, because fuel from fuel supply 304 is well premixed within combustion chamber 206 and combustion starts simultaneously at all points of combustion chamber 206, the event is very rapid and combustion occurs within constant volume before the gas begins to expand.

Engines in most, if not all, embodiments of the invention described herein can run using various cycles including HEHC, modified HEHC (when combustion occurs at isochoric conditions first and isobaric condition second, and/or Homogeneous Charge Stimulated Ignition (HCSI), described below. Moreover, if high pressure fuel injectors are used, it is possible to switch between these cycles on the "fly" during the operation of the engine.

Thus in a further embodiment of the present invention, Engine 1000 is configured to execute the HEHC, described in our published patent application WO 2005/071230, which is hereby incorporated herein by reference. The compressed working medium, which may be stored in an intermediary buffer at ~50 to 70 bar pressure or above, is admitted to a completely enclosed constant volume working chamber, formed during first angular range of the cycle, and containing exhaust gases from the previous cycle at ambient pressure. Working medium, which may be air, for example, is admitted into this combustion chamber through air valve assembly, 118 of FIG. 1, containing a check-valve and a second valve or a latching check valve. After that, the high pressure fuel injectors may inject fuel into the combustion chamber, and combustion proceeds in a manner similar to conventional Diesel engines, except that combustion occurs in a constant volume space. When ignition occurs, the supply of air is brought to a halt by virtue of air valve assembly 118, which may contain a check valve and electronically controlled valve or latching check valve, so that flow into the intermediary buffer is prevented. Performance characteristics for this cycle are shown in FIG. 28.

The fuel injection may continue through the second angular range (expansion stage), i.e. within expansion chamber 208. In this phase, the engine will demonstrate diesel-like performance with the exception of a higher expansion ratio (Atkinson cycle)—for that reason, we call this cycle a modified HEHC.

In addition to HEHC or modified HEHC cycles, most, if not all, embodiments of the invention described herein can run, what we call a Homogeneous Charge Stimulated Ignition (HCSI), which is a variation of known Homogeneous Charge Compression Ignition (HCCI).

In HCCI engines a lean fuel/air mix is compressed to high compression ratio (~18 to 20) within the cylinder of the engine. Since the fuel is already well pre-mixed within the combustion chamber in HCCI engines, it forms a homogeneous charge, which then ignites due to an increase in temperature due to compression—hence the name HCCI. Unlike the Otto engine, one can compress to such a high ratio here due to the use of a very lean fuel/air mix. On the other hand, unlike a Diesel engine, the combustion is very rapid, almost instantaneous, and thus occurs at nearly constant volumes. These engines have high efficiencies and may run on any fuel. An essential requirement for these engines, as is true for any reciprocating piston engines is that ignition has to occur at or near the Top Dead Center (TDC), a criterion that creates a very difficult problem in controlling the exact moment of ignition, as it depends on a great many parameters such as fuel to air ratio, compression ratio, air temperature and humidity, EGR rate, cylinder wall temperature, etc., etc. For this reason, engines of this design are not commercialized. Also, due to the lean mixture, the power density is low. (One is not using all the air in the mix, so for the same power one needs a bigger cylinder volume.)

In contrast, engines in accordance with embodiments of the invention herein described can be considered to work on a variation of the HCCI principle, but use of the distinctive engine geometry makes the time of ignition much less critical, as will be explained below. When compressed working medium (air) is injected into the combustion chamber from the intermediary buffer, it is initially decompressed (and cooled) and then recompressed (and re-heated) when pressure in the combustion chamber reaches the pressure of the intermediary buffer. Due to the very large pressure difference between the intermediary buffer and the combustion chamber, which is initially at ambient pressure, a supersonic swirl or vortex of rotating air, which rotates at very large rate (1,000,000 RPM or above), is formed by the air entering the combustion chamber. The fuel, injected simultaneously with air into a low pressure environment, will be dragged into the chamber by the air swirl, mix very well with the air and evaporate very quickly, if it is a liquid fuel. The fuel supply is then cut off by the fuel valve assembly 318 from the signal generated by controller 319, while air continues to fill the combustion chamber and keeps increasing the pressure. Therefore, unlike a conventional reciprocating piston engine, which compresses the air by moving a piston, HCRE engine compresses the air/fuel mixture by the air itself. When temperature and pressure reach the auto-ignition point, the fuel is going to ignite within the whole volume, in a manner similar to HCCI engines. At this point of time, pressure buildup in the combustion chamber causes the check-valve of the air valve assembly 118 to close, followed by closing of a secondary air valve as a result of actuation by controller 319. Thus the energy losses associated with decompression and recompression of air entering the combustion chamber, which, incidentally, constitute only about 0.5%, per our calculations, are converted into a high efficiency fuel/air mixer. This circumstance makes it possible to run an HCRE operating under an HCSI cycle at a high rpm rates, a performance not achievable by Diesel engines.

It is furthermore possible to accelerate the ignition event by utilizing all the same means that are used in HCCI engines such as fuel to air ratio, compression ratio, air temperature and humidity, EGR rate, cylinder wall temperature, etc, and also by adding additional control means such as relative timing of air and fuel injections, presence of catalyst within the combustion chamber, etc.

Moreover, it can be seen from this description that the check valve automatically causes the air supply to be cut off at precisely the moment when pressure in the combustion chamber exceeds pressure in the compressed air supply. This circumstance, coupled with an engine geometry that dispenses with the need (in a conventional piston engine) for critical synchronization of combustion with top dead center of the piston, eliminates the need for complex calculation of the point of combustion. Furthermore, in embodiments of the present invention, the fuel/air mixture is formed during the admission of air into the working chamber and is at temperatures below auto-ignition. Thus unlike HCCI engines, in which timing of combustion depends critically on position of the piston in the cylinder, in embodiments of the present invention, engine geometry matters little, so combustion can occur at or near the point of air and fuel injections, which are always at our control, at a point in the cycle when other conditions have been optimized.

Performance characteristics of the cycle are shown in FIG. 29. The difference between this cycle and the HEHC above is that instead of conditioned air, the system uses a conditioned air/fuel mixture, such that the fuel-to-air ratio is on the lean side and ignition occurs not due to fuel injection as above but is triggered by combustion stimulating means. It is similar to the HCCI cycle, which is currently under development by numerous groups of scientists and engineers, but, unlike the HCCI cycle, the HCSI engine does not require complicated computer controls, due to the fact that the combustion event may occur at any moment during the times combustion chamber 206 exists (90 to 180 degrees of revolution of the hub 220), by having a one way valve that will separate combustion chamber 206 from the air/fuel supply at the moment of the combustion event and forward until either pressure in combustion chamber 206 exceeds the pressure in the air/fuel supply or alternative mechanical or electromechanical valves shut off the fuel supply.

Figure 15:
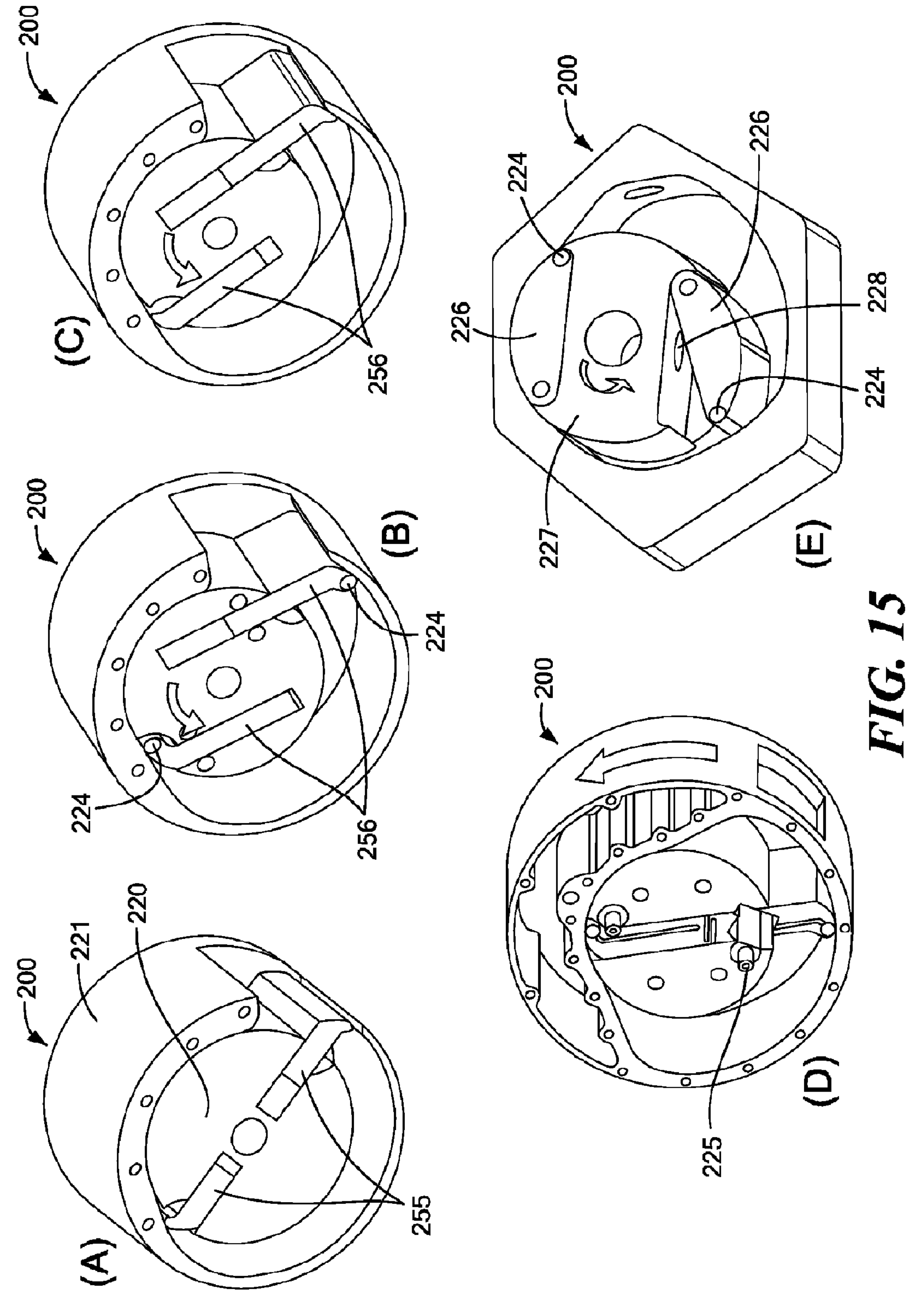
FIG. 15A-E shows an expander, according to several alternate embodiments.

Several other possible variations on the design of PGM 200 are now described with reference to FIG. 15. FIG. 15A shows how PGM 200 could be configured with two collinear blades 255. These blades 255 would work similarly to sliding blade assembly 214 described above, but in this configuration hub 220 can provide a central hole, allowing, e.g., fuel from supply 304 and air 305 to travel through. In this design, housing walls 221 remain stationary, while hub 220 and blades 255 rotate around a fixed axis going through the center of hub 220 and the hole.

In another variation, two blades 256 could be used that are parallel but not collinear, as shown in FIGS. 15B-C. In this configuration, longer blades 256 may be used than in the case of parallel blades 255, meaning the expansion area will be larger than in the collinear case, giving a boost to power. In FIG. 15B this is implemented using rollers 224 on the tips of blades 256 to reduce friction. FIG. 15C shows a configuration where friction is reduced without rollers, but rather using any number of alternatives such as those discussed below in the section about sealing and lubrication issues.

A variation (not shown) uses standalone combustion chambers 225, similar to those used in our published application WO 2005/071230, incorporated herein by reference. A potential advantage of this approach is that combustion time could be extended by utilizing two, three or more combustion cavities 225. One of these combustion cavities 225 is shown on a cutout view incorporated within the lower chamber.

Figure 16:
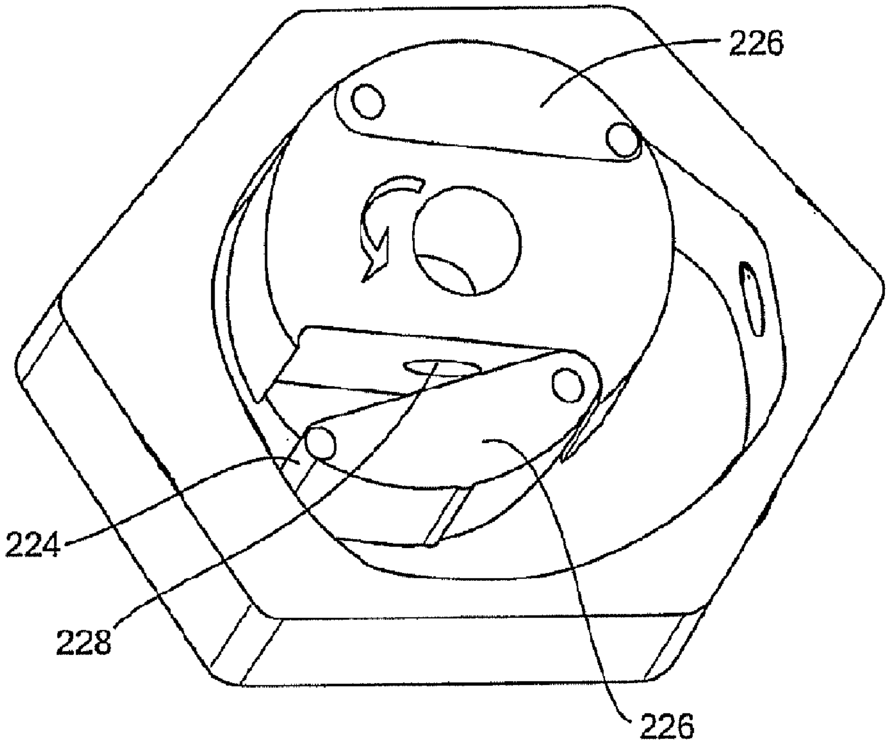
FIG. 16A-B shows an expander, according to an alternate embodiment with pivoting blades.
Figure 16:
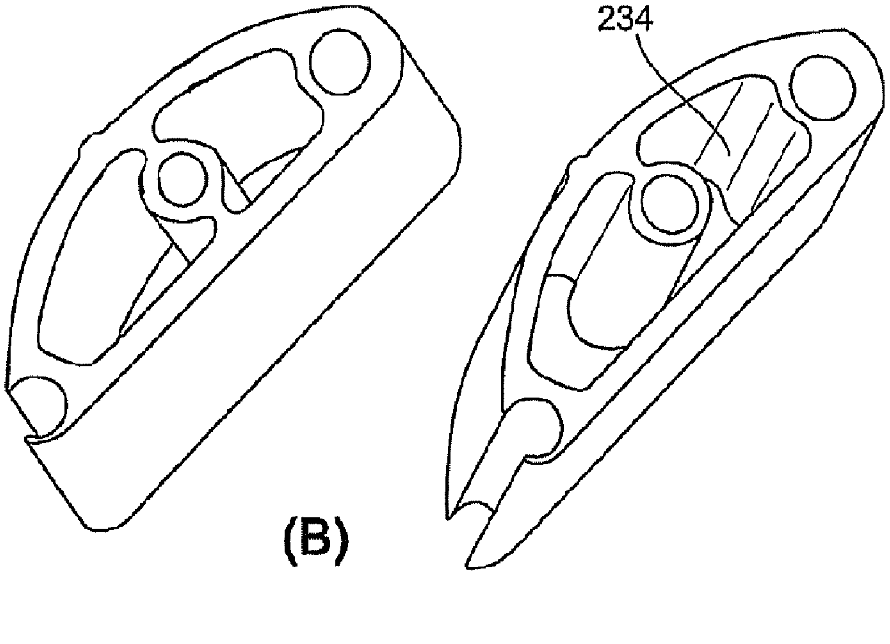

FIG. 15E and FIG. 16 show a variation using a pivoting blade 226 instead of a sliding blade. Blade 226 is connected to a rotating hub 227 at a pivot point. A combustion chamber 228 is located within hub 227 and is sealed with blade 226 while blade 226 is within a fixed (idling) position with respect to hub 227. During this blade idling, the conditioned air/fuel mixture enters combustion chamber 228 through one way valve (not shown) from air buffer 205 (the valve, which allows the conditioned air fuel mixture to enter combustion chamber 228 is also not shown) and gets ignited during a CSM event. The central hole within hub 227 may serve as an air buffer. Blade 226 may have optional roller 224 running on the walls of housing 221 and providing the seal. Alternatively, it can use the Wankel-type apex seal instead of roller or no seal at all if it is made with wear resistant material as well as housing.

Figure 17:
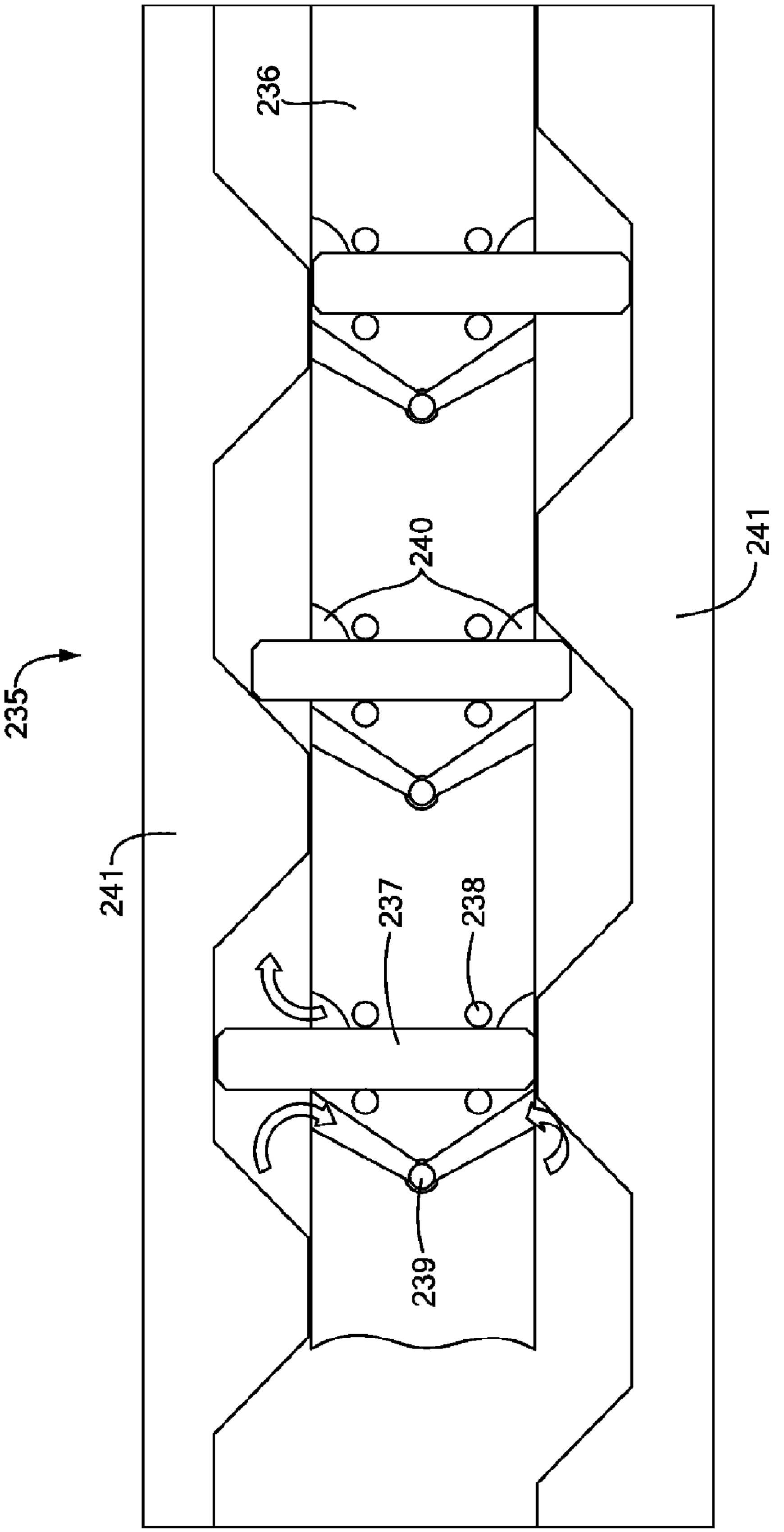
FIG. 17 shows an expander, according to an alternate embodiment based on an axial vane concept.
Figure 18:
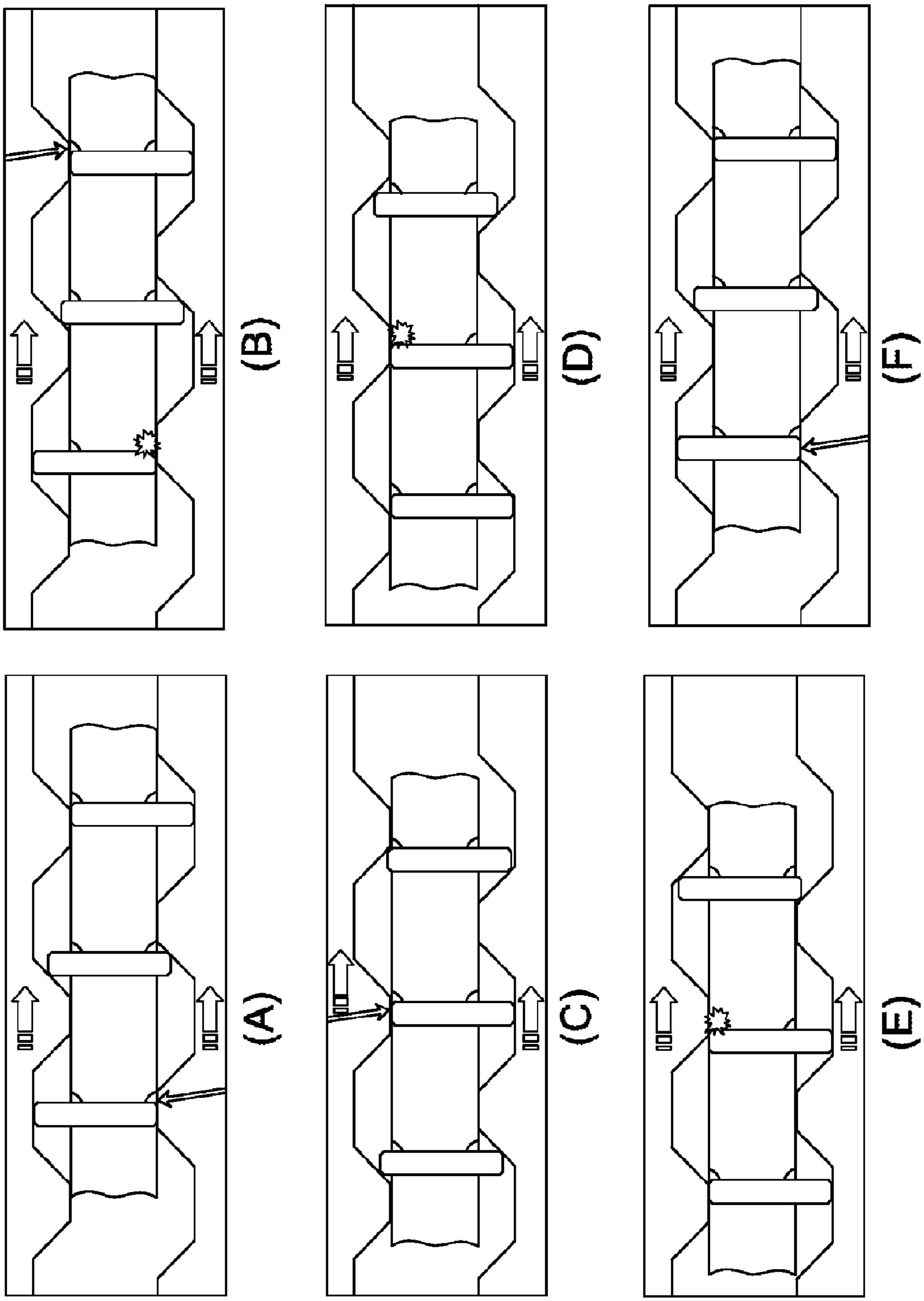
FIG. 18A-F shows the operation of an expander over a full cycle, according to an alternate embodiment based on the axial vane concept.

An altogether different variation of engine 1000 is shown in FIGS. 17-18. It is based on the axial vane rotary engine (AVRE) configuration, which was considered in U.S. Pat. No. 4,401,070, which is incorporated herein by reference, and in earlier prior art. This configuration could be implemented to run under HEHC.

The expander 235 configuration of HEHC-AVRE is shown in FIGS. 17-18. While shown in a plane, it should be realized that we are actually looking at unwrapped cylindrical bodies. While resembling the prior art in construction, the operation of engine 1000 is very different. Air 303 is compressed by a separate compressor. As is true for any other configuration of the HEHC engines, the compressor part could be of substantially same design or of any other designs mentioned in this invention or available commercially, as long as it is capable of compressing air 303 to high compression ratios (15-40). Also, the intake volume of the compressor should be about half of that of the expansion chamber of expander 235 to take advantage of the Atkinson part of the cycle.

Expander 235 consists of: a stator ring 236, and holding vanes 237, which slides in the axial direction. It may have rollers 238 that inhibit friction between the blades and ring 236. Stator ring 236 also houses combustion chambers 240, discussed below. In addition, stator ring 236 houses exhaust ports 239, which exhaust already expanded combustion gases. These gases are pushed out by the motion and the shape of a rotary cam ring (RCR) 241, described below (see FIG. 17).

RCR 241, driven by expanding combustion gases, rotates around the axis and drives the output shaft (and possibly the compressor). It also imparts the intermittent reciprocating axial motion to vanes 237. The key feature of RCR 241 is that it provides a dwell period to vanes 237 during which vanes 237 are stationary with respect to stator ring 236, thus forming a constant volume combustion chamber 240. During this stationary period, compressed air 305 is admitted through appropriately controlled valves (not shown) into combustion chamber 240, which is at ambient pressure at that moment. Either simultaneously with air 305 or with some delay, fuel from fuel supply 304 is injected into combustion chamber 240. Due to very turbulent swirling, fuel from fuel supply 304 is well intermixed with air 305. The mixture spontaneously ignites and combusts until completion, all while still under the dwell period or under conditions of constant volume combustion.

Vanes 237 slide inside stator ring 236. The only function of vanes 237 is to stop combustion gases from escaping the expansion chamber. Vanes 237 should have some sealing mechanism to enable this function. of the sealing mechanism may utilize Wankel-style apex and face seals or some other sealing approaches discussed in this document and in previous patent applications by these authors.

It should be noted that a number of variations of the above configuration are possible and apparent to those skilled in the art. For example, stator ring 236 may be rotary, while cam ring 241 may be stationary. Combustion chamber 240 may be formed by a cutout within vane 237, rather than within ring 236. Exhaust port 239 may be located within cam ring 241. Vanes 237 in the drawings are represented as a single body, but could consist of two or more sliding parts, supported by springs, sliding blade seals, etc.

Figure 19:
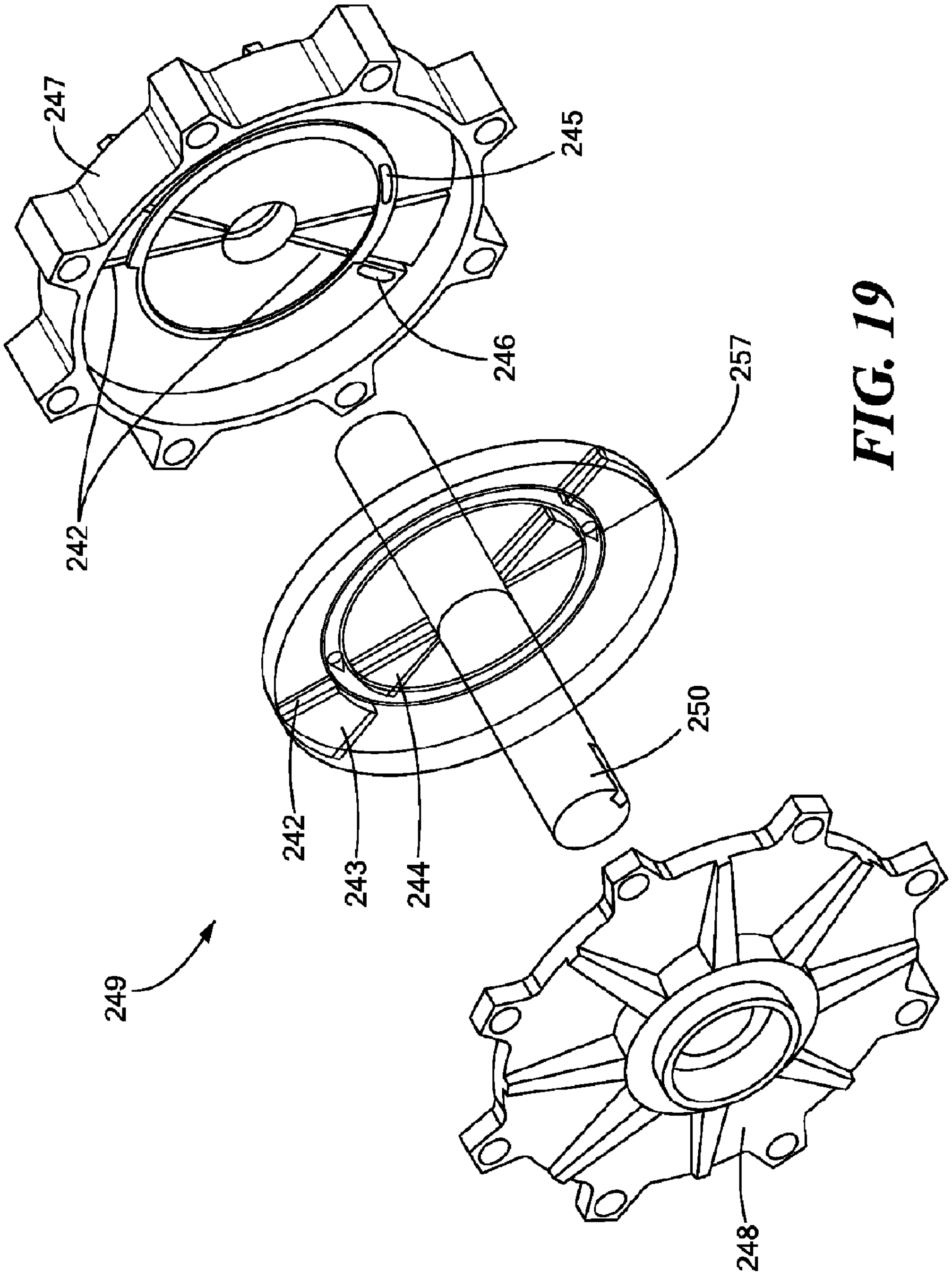
FIG. 19 shows an HCRE according to an alternate embodiment based on a concealed blade technology.

Another variation, radically different from all of the above, is the concealed blade technology (CBT) engine. The idea behind CBT, shown as item 249 in FIG. 19, is to replace some or all of the blades and/or pistons in previous configurations with a virtual chamber, which is implemented with fluidic diodes 242 or radially located slots, which resist flow in one direction and permit it in the other. The fluidic diode is disclosed in our U.S. Pat. No. 7,191,738, which is hereby incorporated herein by reference, as a check valve. See col. 8, lines 45-50, and FIG. 3(*a*) thereof. It is also disclosed in our published application WO 2005/071230, which is hereby incorporated herein by reference, as a sealing mechanism. (See page 46, paragraph 157 through page 47, paragraph 163, and accompanying figures.) A fluidic diode, invented by Nikola Tesla, is a physical structure that permits ready flow in a first direction, but in the case of flow in the opposite, the use of one or more angled slots in which is placed a suitable structure creates one or more vortices that impede flow. See also Tesla's U.S. Pat. No. 1,329,559, which is hereby incorporated herein by reference. In the embodiments herein, each diode may be implemented with as few as one angled slot, as in FIG. 3(*a*) of our U.S. Pat. No. 7,191,738, and FIGS. 43(*a*), (*b*), (*c*) and (*d*) of our WO 2005/071230, even though Tesla's patent shows a large number of angled slots used simultaneously. In particular, we use here one or more fluidic diodes disposed radially in a disk that rotates with respect to a body that also includes one or more fluidic diodes. The diodes are configured in relation to one another so that rotation of the disk relative to the body traps air between the two diodes as they approach one another. The air is trapped in what we call a "virtual chamber" formed between the body, the disk and the two fluidic diodes. The arrangement therefore establishes a virtual piston, which can be used to establish a compressor. Alternatively, the virtual piston can be used to establish an expander for harnessing pressure from combustion As we mention, although a disk in this example is the member rotating with respect to the body, other shapes may be used. For example, the rotating member may be a cylinder or it may be conical, and in each case the interior of the body conforms to the shape of the rotating member.

Still referring to FIG. 19, the combustion chamber cavity is behind fluidic diode 242 (concealed blade) of rotating rotor or in front of stationary rotor. This embodiment may be considered as an improvement on the tesla disk or tesla turbine, but here transformed into an internal combustion engine. FIG. 19 thus illustrates a turbine by mechanical design and a piston engine by thermodynamic cycle and definition of volume expansion engines. The engine utilizes a rotating disk, item 257, that is rotatably mounted in the body 247. Both the disk and the body are fitted with fluidic diodes 242. The trapping effect is thus compression and is used in a radial band associated with a compressor region of the engine, The working medium (which may include air or other oxygen-containing gas) from the compressor region is then fed, past a valve assembly that also incorporates one-way check valve, from a compressor exhaust port 245 into a buffer region disposed in the body 247. The working medium is then moved from the buffer region into a substantially fixed volume combustion chamber formed in body 247 and covered by a region of the rotating disk. At this point in the cycle, if it has not been previously a part of the working medium, fuel is introduced, and ignition and combustion occur, generating heat and therefore increased pressure of the working medium. Following this part of the cycle further rotation of the disk permits the working medium at increased pressure to enter an expander chamber associated with a distinct radial band of the engine and causing rotation of the disk relative to the body of the engine. Yet further in the cycle, the working medium, now expended, is permitted to leave the engine via an exhaust port, that is in accessible to the working medium while it is in the expander chamber. Shown in FIG. 19 in addition to the fluidic diodes 242 are the compressor segment 243, the expander segment 244, the intake port 246, the exhaust port 245, the body 247, the cover 248, and the external shaft 250. From the foregoing description, it is apparent that fluidic diodes used in members rotatably mounted with respect to one another can be employed to provide a compressor or an expander. Indeed, the configurations for a compressor or an expander using fluidic diodes are similar. Possible variations to this configuration include adding external standalone cylindrical combustion chambers, using a standalone compressor and standalone expander (i.e. a two-disk configuration), a two sided configuration where compressor is on one side and expander is on the other, using multiple stacked discs, disk versa cylinder versa cone configurations ("pipe-in-a-pipe") with fluidic diodes on ID of external "pipe" and OD of internal "pipe," "pipe-in-a-pipe-in-a-pipe" configuration, and combination of the disk configuration with the pipe-in-a-pipe configuration (conical or straight).

In an HCRE engine, in accordance with various embodiments of the invention described here, blade(s) move with respect to the housing walls, the bearings, the cover, and the hub. And the hub with bearings moves with respect to the housing walls and the cover. To allow for low cost manufacturing, the design of an HCRE should accommodate tolerance gaps between the various moving components on the order of 0.001"-0.003", after thermal expansion is taken into account to allow blow-by of the engine gases. This might be acceptable if the amount of blow-by is small, as it will provide gas lubrication and some cooling to the engine blade(s), the housing and the. However, for better performance of the engine, it might be desirable for the combustion chamber and expansion chamber to be as leak free as possible while still providing lubrication and cooling. Since the moving elements within the engine have a generally rectangular cross section, special attention needs to be paid to the sealing and tribology of the engine components.

There are number of ways to seal the combustion chamber and the expansion chamber. These include abradable thermal spray coatings, apex and face sealing, water sealing, fluidic diode sealing, and strip sealing. A practical solution will be found with one or more sealing arrangements discussed below. Abradable thermal spray coatings represent the same technology used for sealing turbine blades. These coatings withstand temperatures up to 1200° C., and can be applied to a thickness of 2 mm. The blade/hub motion would chisel out a path within the coating inside the housing or the blade or the hub. The result is that the 0.001"-0.003" manufacturing gap between the components can be reduced to almost zero, thereby reducing the leakage from the combustion chamber and the expansion chamber.

Figure 20:
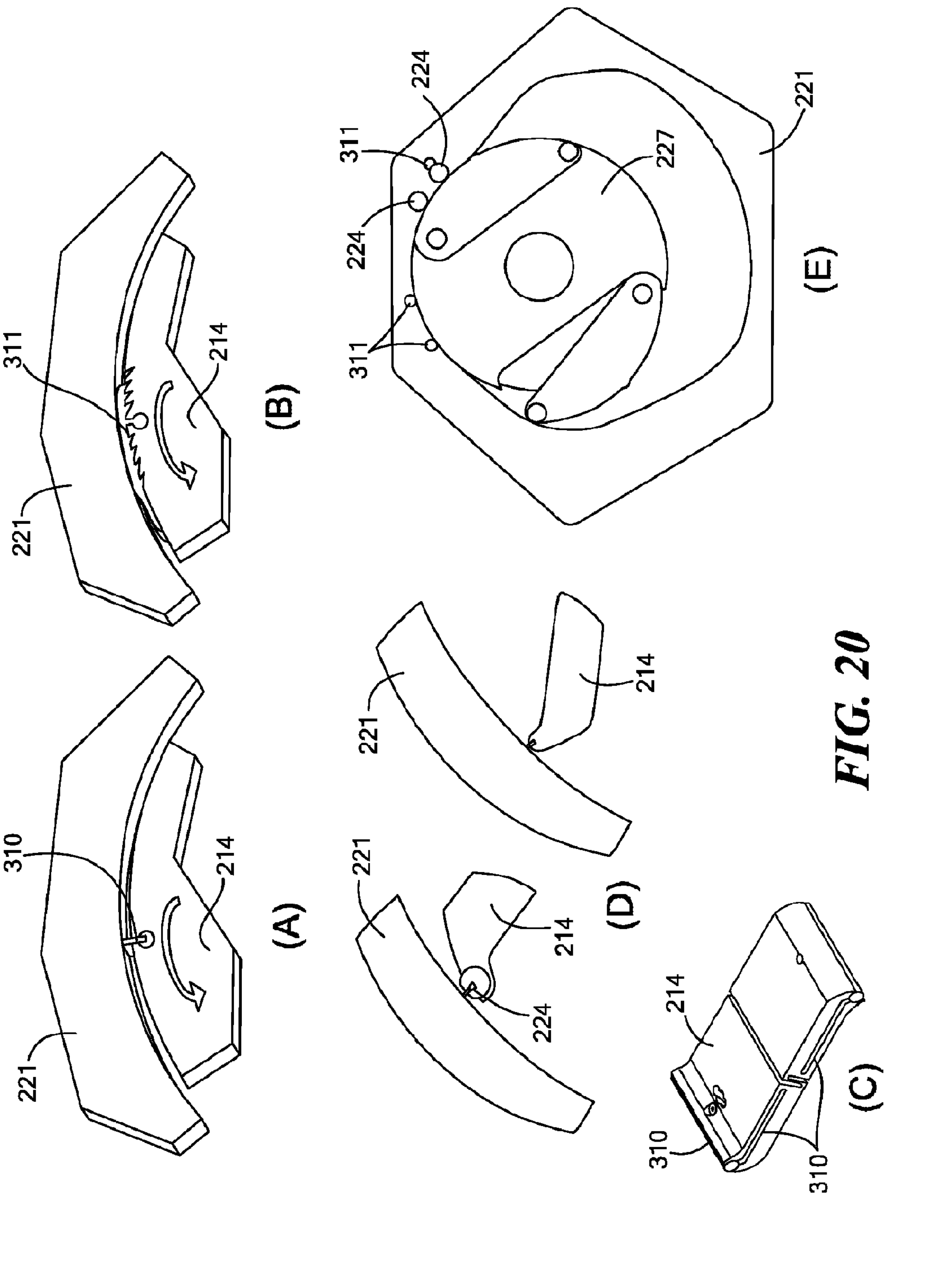
FIG. 20A-E shows several modes of sealing, as practiced in various embodiments.

Another approach to minimizing the leakage, shown in FIG. 20A and FIGS. 20C-D, is to use an apex seal 310. This might be located on the edge of sliding blade 214 and/or used as face seals. Apex seal 310 utilizes a spring loaded sliding vane, which closes the small gap (~0.001"-0.003") between blade 214 and housing walls 221. The spring is not shown in the figure. The sliding vane is normally made out of high wear material such as ceramics, boron nitride, etc. It is also possible to install seals made out of various forms of carbon or graphite materials, such as monolithic, expanded graphite sheets or "ropes" (yarns), implemented as a packing seal. The apex seal concept is applicable to blade 214 with or without rollers 224, shown in FIG. 20D.

Figure 21:
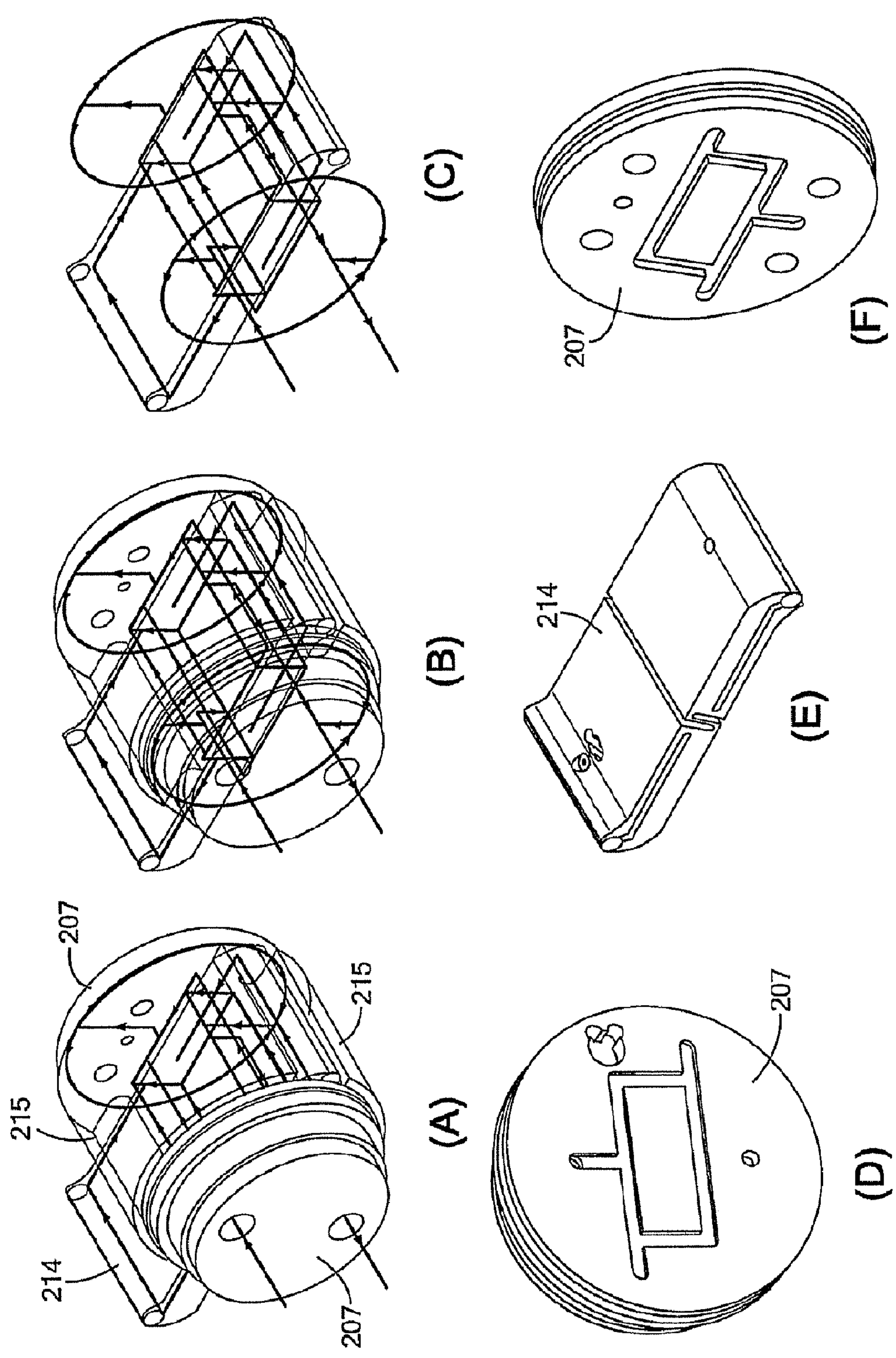
FIG. 21A-F shows an implementation of water sealing, as practiced in an alternate embodiment using a sliding blade.

Still another alternative sealing arrangement could be accomplished by utilization of the water seal concept described in our published application WO 2005/071230, and elaborated herein in the context of HCRE 1000, with reference to FIG. 20B, FIG. 20E, and FIG. 21. According to the water seal concept, high pressure water 311 enters the channel in a moving part shown in FIG. 20B and fills a very small gap (on the order of 0.001" to 0.003") between parts. Water 311 is dragged by the moving part and spread as a thin film occupying the gap and resisting the gases in front of this thin layer to penetrate this gap. The surface on the moving part near the channel delivering water is serrated to form barriers for smooth flow of water film within the gap. In engine 1000, the parts are very hot and some water will evaporate, forming hydraulic lock and preventing water 311 from blowing out of the gap. Evaporative cooling provides a very efficient way to cool engine components as a relatively small amount of water is required to be evaporated as compared to regular water flow cooling. This is due to the fact that the heat of water evaporation is significantly higher than the corresponding heat capacity of the flowing water. However, it should be stated that this evaporative cooling does not preclude us from using conventional water flow cooling means, if such will prove to be useful and necessary.

Water seal 311 could be applied to pivoting blade assembly 226 with or without rollers or to housing 221, in which case it can be applied directly between housing 221 and hub 227, or between housing 221 and roller 224 within housing 221, as shown in FIG. 20E. Roller 224 will then seal the gap with housing.

Figure 12:
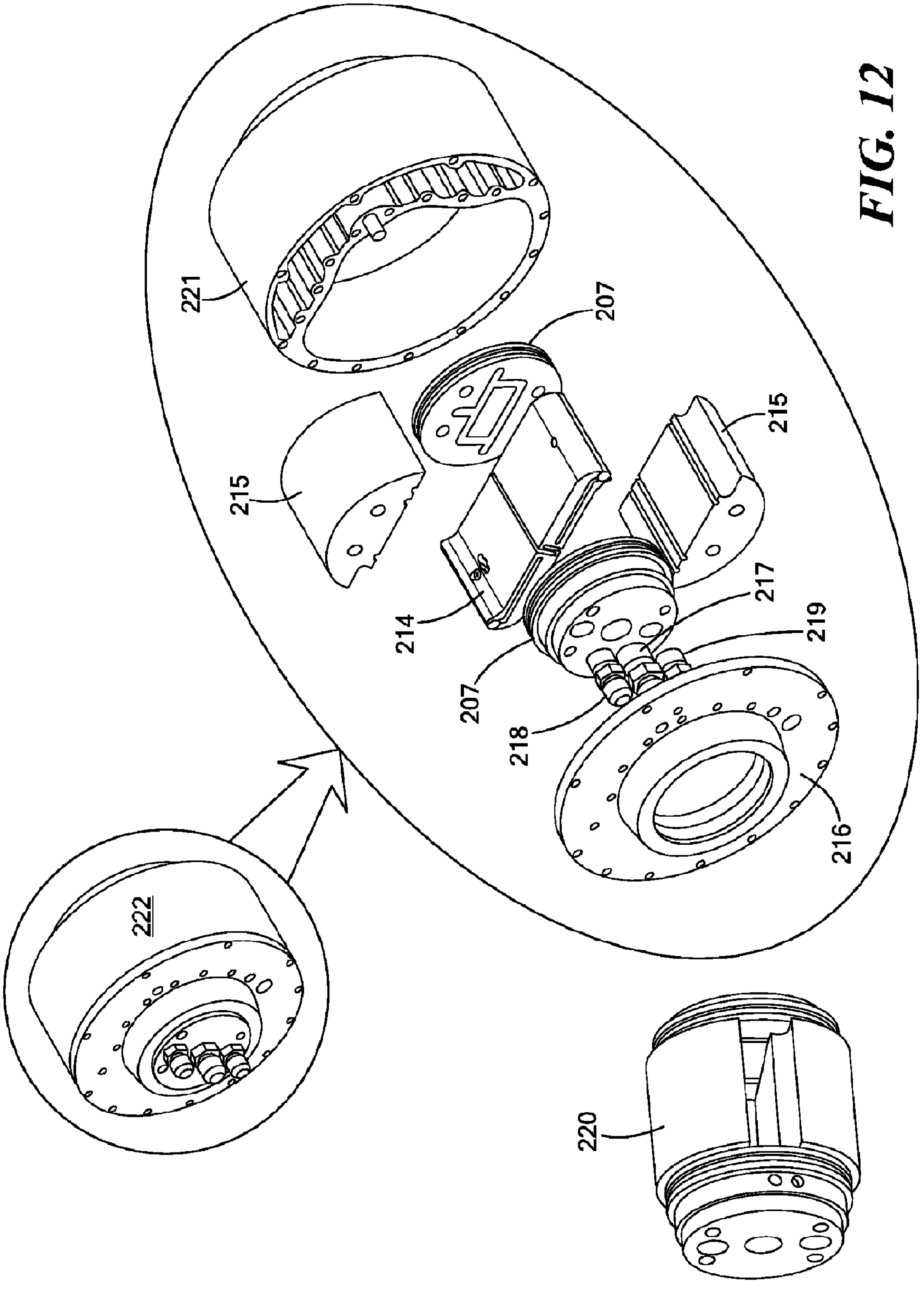
FIG. 12 shows the internal structure of an expander in an HCRE, according to an alternate embodiment using a sliding blade.

In expander 222 from FIG. 12, water 306 (see FIG. 1) enters through water inlet fitting 218, passes through the strategically located water channels within bearing 207, two semi-cylindrical guides 215, and sliding blade assembly 214, and exits through water outlet fitting 219. This water 306 also enters the bearing surfaces of bearings 207 providing for fluid film hydrostatic/hydrodynamic bearings, eliminating the need for conventional bearings. But conventional bearings still could be used in this application.

FIG. 21 gives more details of the application of the water sealing concept to engine 1000. FIGS. 21A-C show water passages inside the channels formed within the various elements of the expander. These channels also are shown within bearing 207 in FIG. 21D, sliding blade 214 in FIG. 21E, and bearing 207 in FIG. 21F. Arrows in FIG. 21C indicate the direction of inflow and outflow.

Therefore, water in engine 1000 has sealing, cooling, lubricating and NOx reduction (as it lowers combustion chamber temperatures) functions. In addition, as was explained above, water will increase efficiency of engine 1000 since some of the energy, normally lost due to cooling losses, is returned back into the system in the form of superheated, high pressure steam.

One interesting possibility is to replace the water in the above concept with diesel or diesel-like fuels, which have better lubricity, are non-corrosive, and do not require a condensing unit. Since gaps to be closed are very small, the consumption should be insignificant. Moreover the consumption during expansion phase is useful, since vaporized fuel will be burned in combustion chamber and expansion chamber. Still another alternative is to add methanol to the water mix, which will prevent the water from freezing. The methanol will burn when it gets into combustion chamber.

We can also use a liquid in conjunction with a liquid-conduit. Water, oil, liquid fuel, etc., could be used for a liquid, while a small diameter (2-5 mm) carbon/graphite or metal mesh, made in the form of a pipe or a rope and placed within channels similar to the ones shown on FIGS. 21A-C could be used as liquid-conduits. High pressure liquid will be pumped through these conduits, which do not even have to be water tight, as water leaking through it will evaporate and aid in cooling, sealing and lubrication.

Another sealing concept that could be applicable is the fluidic diode seal. This concept was discussed at length in our published patent application WO 2005/071230, and is incorporated herein by reference.

Figure 22:
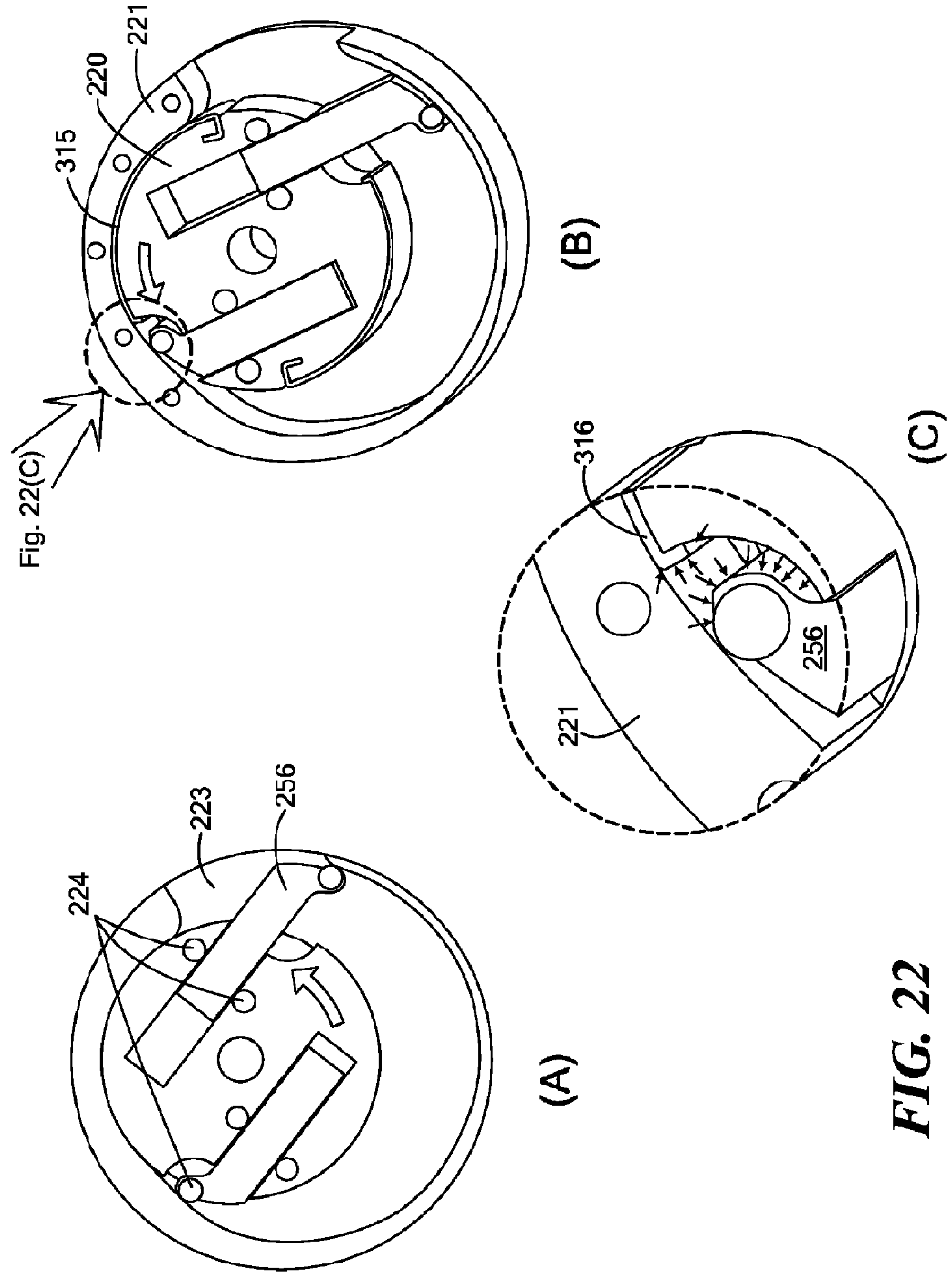
FIG. 22A-C shows implementations of sealing techniques, as practiced in alternate embodiments.

A strip seal 316 can be used on both hub and/or blade. As shown in FIGS. 22A-C, it consists of a strip of metal and is designed, similarly to a blade apex seal, in such a way that the net force due to the pressure on strip 316 is small and directed toward housing walls 221. Having a small net force will insure that the wear on both strip 316 and walls 221 will be insignificant. The direction of the force will insure that strip 316 is in constant contact with walls 221, while maintaining leak-free contact with hub 220 or blade 256.

The arrows in FIG. 22C represent pressure due to combustion products. Blade 256 is designed in such a way that the net force due to the pressure on blade 256, whether rollers are used or not, is small and directed toward housing walls 221. Having small net force will insure that the wear on both blade 256 and walls 221 will be insignificant. The direction of the force will insure that blade 256 is in constant contact with walls 221, thus ensuring leak-free operation, at least in this specific interface.

Figure 23:
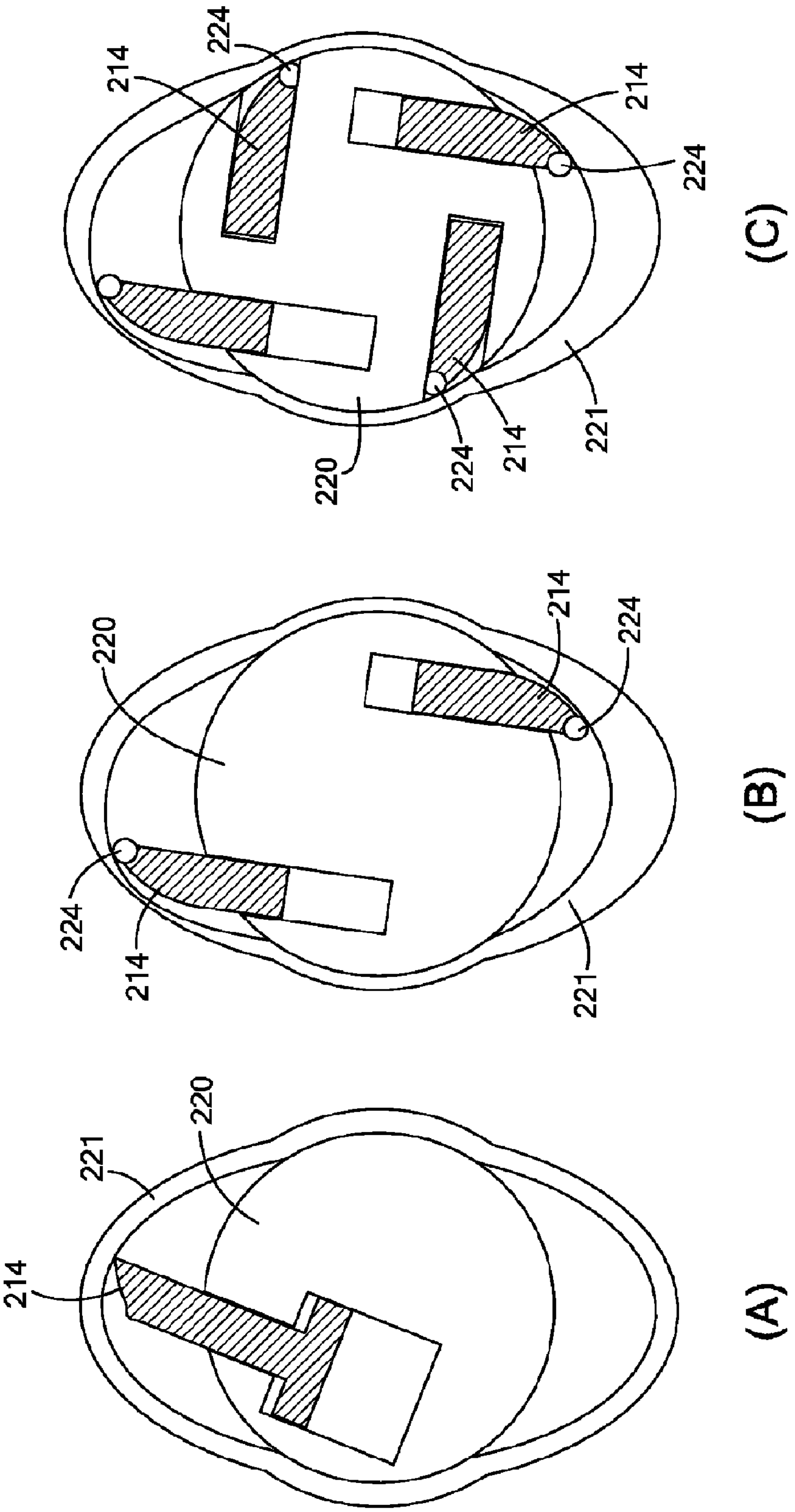
FIG. 23A-C shows several variations on an alternate design for a compressor.

The basic concepts underlying the design of engine 1000 can be applied to other engine configurations as well. FIG. 23 shows several alternative designs for compressor 101. In FIG. 23A a blade-piston 214 is situated in a central hub 220, and either hub 220 or housing 221 rotating relative to the other will produce compression in two strokes per cycle. In FIG. 23B this design is modified by putting a second blade-piston 214 into hub 220, parallel to the first. Also, for illustrative purposes, we see that design implemented using rollers 224 on the tips of blade-pistons 214. This configuration will lead to two compression strokes per cycle for each blade, for a total of four, if configured with one stage, or two compression pulses per cycle if using a two-stage configuration. And in FIG. 23C we see the design modified again to have four blade-pistons 214, consisting of two sets of parallel blades that are positioned on perpendicular axes relative to each other. This configuration will lead to either four or eight compression pulses per cycle, again depending on whether the compressor is configured for one-stage or two-stage operation.

Figure 24:
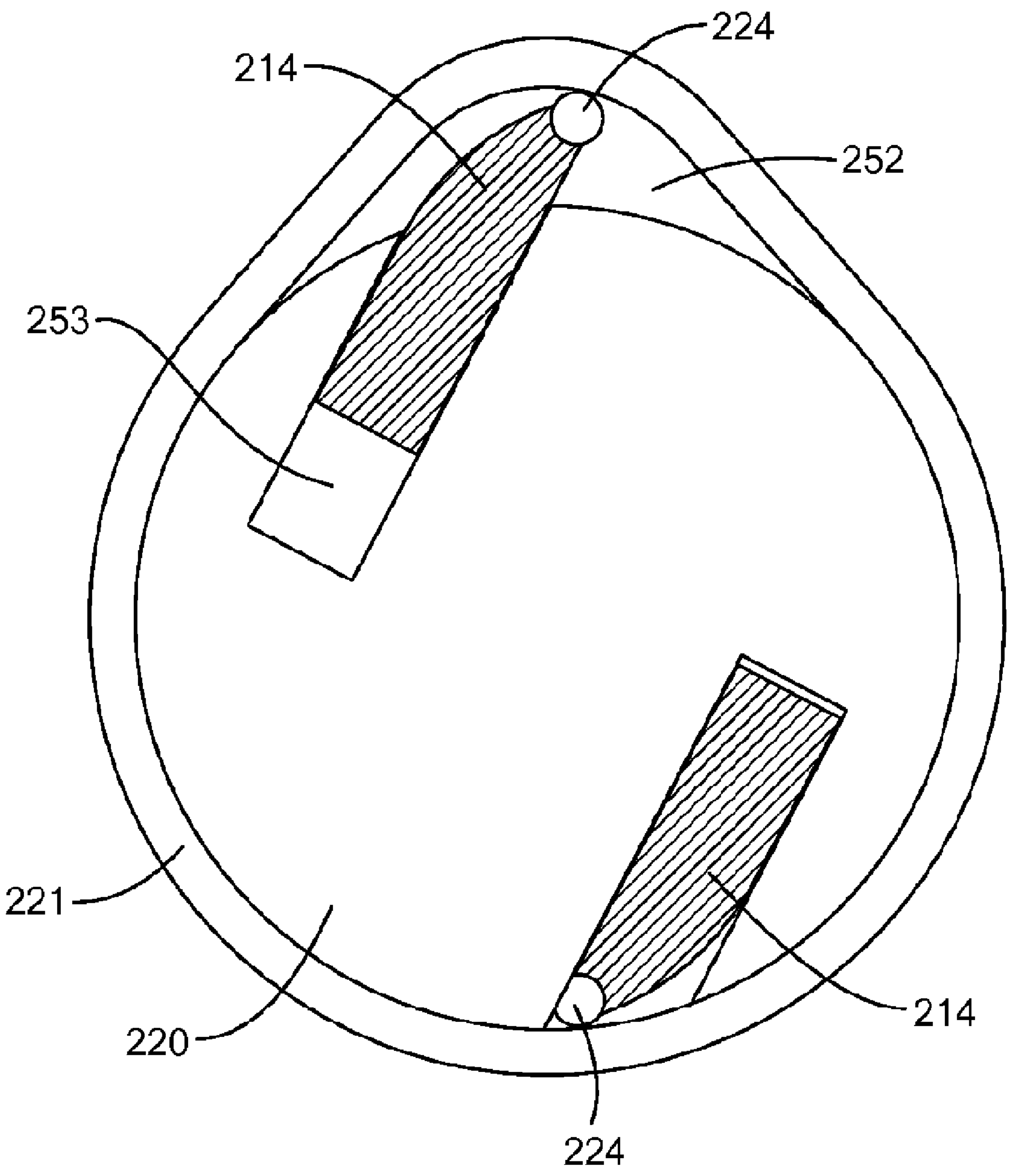
FIG. 24 shows an alternate design for a compressor using two blades and one chamber.

In FIG. 24 we see an example of a rotary vane expander 252 with a piston-type compressor 253 in a single unit. The entry of piston 214 into hub 220 causes compression, while the movement of blade 214 through the expansion area defines the expansion chamber.

Figure 25:
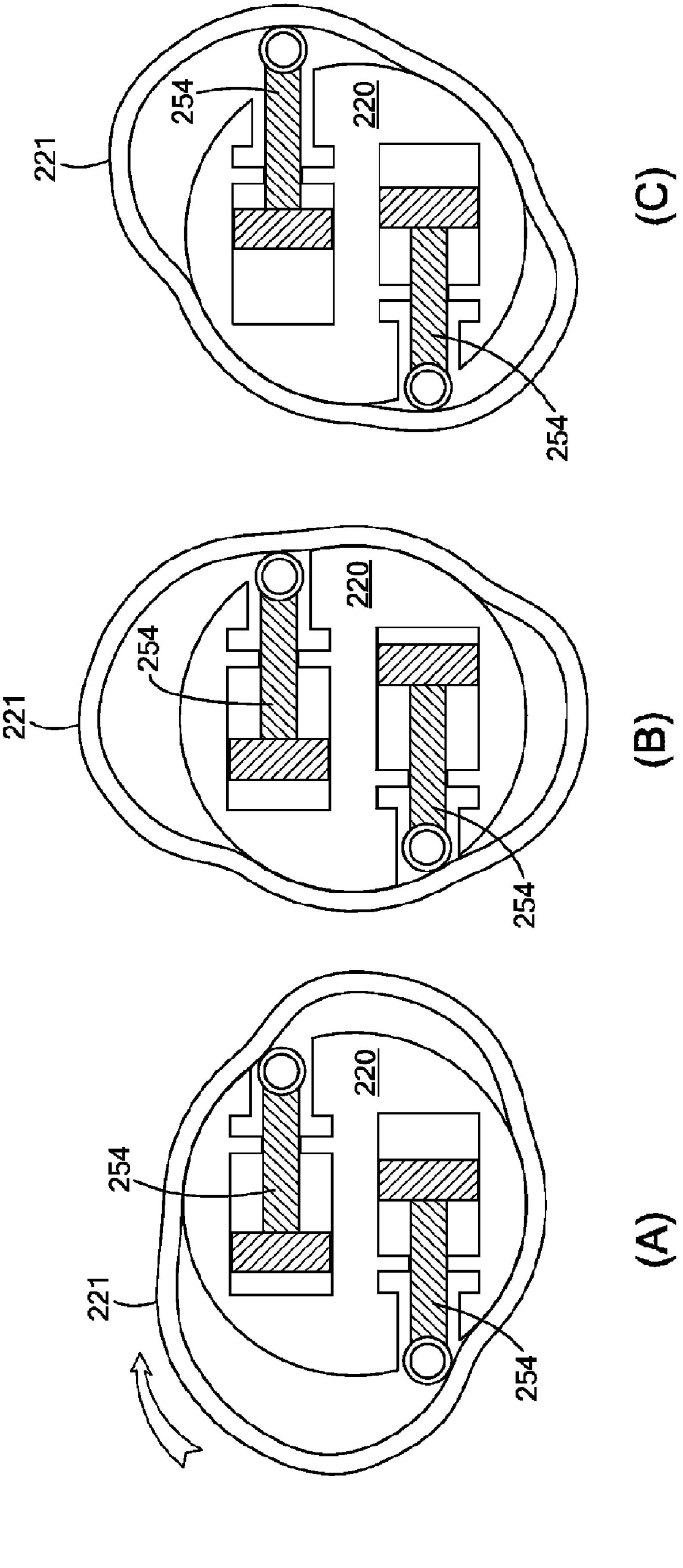
FIGS. 25A-C show various aspects of the internal assembly and functions of the compressor and the expander in an HCRE.

Conventional pistons can also be adapted to implement the HEHC thermodynamic cycle in a rotary engine, as shown in FIG. 25. As hub 220 and/or housing 221 rotate relative to each other, pistons 254 travel a cycle into and out of hub 220. In operation without a crankshaft, the engine is driven by a cam ring (not shown) and the cam profile corresponds to the Atkinson cycle.

Although various exemplary embodiments of the invention have been disclosed, it should be apparent to those skilled in the art that various changes and modifications can be made which will achieve some of the advantages of the invention without departing from the true scope of the invention.

What is claimed is:

1. A combustion engine utilizing a virtual piston assembly, the combustion engine comprising:

a body having an interior and additionally having an inlet port, an exhaust port, and a first angled slot configured to function as a first fluidic diode; and a rotating member mounted within the body, the rotating member including a second angled slot configured to function as a second fluidic diode, the first angled slot and the second angled slot being oppositely disposed in the body and rotating member respectively at corresponding outer radial locations so that when the rotating member rotates, the opposed first and second slots define therebetween a first circumferential swath of varying angular extent;

wherein the body further includes a third angled slot configured to function as a third fluidic diode and the rotating member including a fourth angled slot configured to function as a fourth fluidic diode, the third angled slot and the fourth angled slot being oppositely disposed in the body and the rotating member respectively at corresponding inner radial locations so that when the rotating member rotates, the opposed third and fourth slots define therebetween a second circumferential swath of varying angular extent;

wherein the rotating member is disposed in relation to the body, and the body has a correspondingly shaped interior, so as to form, (i) in the outer radial locations, a first virtual chamber having a volume that varies with the rotation of the rotating member in a manner corresponding to the angular extent of the first circumferential swath and (ii) in the inner radial locations, a second virtual chamber having a volume that varies with the rotation of the rotating member in a manner corresponding to the angular extent of the second circumferential swath; and wherein one of the first and second virtual chambers is configured as a compressor in the engine and the other of the first and second virtual chambers is configured as an expander in the engine.

2. A combustion engine according to claim 1, wherein the rotating member is a disk.

3. A combustion engine according to claim 1, wherein the rotating member is conical.

4. A combustion engine according to claim 1, wherein each of the angled slots is defined by a plurality of channels within the respective rotating member, the channels bifurcating proximate to a first opening on the rotating member and converging at a conflux region proximate to a second opening on the rotating member, the channels having a shape so as to impede a flow of fluid in one direction and to allow ready flow of the fluid in an opposite direction.

5. A combustion engine according to claim 1, wherein at least one of the angled slots is defined by a plurality of angled structures within a recess so as to cause a fluid to bifurcate and then perpendicularly converge, thereby impeding the flow of fluid in one direction while allowing ready flow in another direction.

6. A combustion engine according to claim 1, wherein the virtual chamber comprises fluid trapped between the moving fluidic diode and the stationary fluid diode as result of the rotation of the rotating member.

* * * * *

UNITED STATES PATENT AND TRADEMARK OFFICE

CERTIFICATE OF CORRECTION

PATENT NO. : 8,365,699 B2
APPLICATION NO. : 12/939752
DATED : February 5, 2013
INVENTOR(S) : Shkolnik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this
Thirteenth Day of August, 2013

Teresa Stanek Rea
*Acting Director of the United States Patent and Trademark Office*